US012792177B2

(12) United States Patent
Oh et al.

(10) Patent No.: US 12,792,177 B2
(45) Date of Patent: Nov. 10, 2026

(54) DISPLAY PANEL, DISPLAY DEVICE, AND MOBILE TERMINAL INCLUDING THE DISPLAY DEVICE

(71) Applicant: LG Display Co., Ltd., Seoul (KR)

(72) Inventors: Seung Taek Oh, Gyeonggi-do (KR); Joung Mi Choi, Gyeonggi-do (KR); Dong Gun Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/180,444

(22) Filed: Apr. 16, 2025

(65) Prior Publication Data

US 2025/0238097 A1 Jul. 24, 2025

Related U.S. Application Data

(63) Continuation of application No. 18/209,587, filed on Jun. 14, 2023, now Pat. No. 12,299,228.

(30) Foreign Application Priority Data

Dec. 12, 2022 (KR) ........................ 10-2022-0172231

(51) Int. Cl.

| | |
|---|---|
| ***G06F 3/044*** | (2006.01) |
| ***G06F 3/041*** | (2006.01) |
| ***G09G 3/20*** | (2006.01) |

(52) U.S. Cl.

CPC ...... *G06F 3/04164* (2019.05); *G06F 3/04166* (2019.05); *G06F 3/044* (2013.01); *G09G 3/2096* (2013.01); *G09G 2330/021* (2013.01); *G09G 2354/00* (2013.01); *G09G 2360/14* (2013.01)

(58) Field of Classification Search

CPC .. G06F 3/04164; G06F 3/04166; G06F 3/044; G09G 3/2096; G09G 2330/021; G09G 2354/00; G09G 2360/14

See application file for complete search history.

(56) References Cited

U.S. PATENT DOCUMENTS

| | | | | |
|---|---|---|---|---|
| 12,027,552 | B2 * | 7/2024 | Lee | H10F 39/8023 |
| 12,299,228 | B2 * | 5/2025 | Oh | G06F 3/04164 |
| 2021/0013298 | A1 * | 1/2021 | Her | H10K 59/353 |
| 2022/0013598 | A1 | 1/2022 | Park et al. | |
| 2022/0045159 | A1 * | 2/2022 | Lee | H10K 59/131 |
| 2022/0068208 | A1 * | 3/2022 | Kang | G09G 3/3233 |
| 2022/0109020 | A1 * | 4/2022 | Lee | H10F 39/8063 |
| 2022/0246710 | A1 | 8/2022 | Woo et al. | |

FOREIGN PATENT DOCUMENTS

| | | | |
|---|---|---|---|
| KR | 10-2022-0007009 | A | 1/2022 |
| KR | 10-2022-0111767 | A | 8/2022 |

* cited by examiner

*Primary Examiner* — Afroza Chowdhury

(74) *Attorney, Agent, or Firm* — Fish & Richardson P.C.

(57) ABSTRACT

A display panel includes a first pixel area in which a plurality of light emitting elements and a plurality of pixel circuit are disposed, and a second pixel area in which a plurality of light emitting elements are disposed, and the second pixel area further may include a plurality of transparent extension lines configured to electrically connect the plurality of light emitting elements disposed in the second pixel area to the plurality of pixel circuits disposed in the first pixel area.

18 Claims, 18 Drawing Sheets

R: light emitting element of red sub-pixel
G: light emitting element of green sub-pixel
B: light emitting element of blue sub-pixel R: light emitting element of red sub-pixel
G: light emitting element of green sub-pixel
B: light emitting element of blue sub-pixel

DISPLAY PANEL, DISPLAY DEVICE, AND MOBILE TERMINAL INCLUDING THE DISPLAY DEVICE

CROSS-REFERENCE TO RELATED APPLICATION

This application is a continuation of U.S. patent application Ser. No. 18/209,587, filed on Jun. 14, 2023, which claims the priority of Korean Patent Application No. 10-2022-0172231, filed on Dec. 12, 2022. The aforementioned applications are hereby incorporated by reference in their entirety.

BACKGROUND

Field of the Disclosure

The present disclosure relates to a display panel, a display device, and a mobile terminal including the display device.

Description of the Background

Electroluminescent display devices may be classified into inorganic light emitting display devices and organic light emitting display devices depending on the material of the emission layer. The organic light emitting display device of an active matrix type includes an organic light emitting diode (hereinafter, referred to as OLED) that emits light by itself, and has an advantage in that the response speed is fast and the luminous efficiency, luminance, and viewing angle are large. In the organic light emitting display device, the OLED is formed in each pixel. The organic light emitting display device not only has a fast response speed, excellent luminous efficiency, luminance, and viewing angle, but also has excellent contrast ratio and color reproducibility since it may express black gray scales in complete black.

Multimedia capabilities of mobile terminals have been improved. For example, cameras are being built into smartphones by default, their resolution is increasing to the level of conventional digital cameras, and biometrics using optical elements are being applied. A front camera of the smartphones restricts a screen design thereof, making it difficult to design the screen. Screen designs with notches or punch holes have been adopted in the smartphones to reduce the space taken up by the front camera, but the front camera still limits the screen size, making it impossible to realize a full-screen display.

To implement a full-screen display, a camera module may be disposed to overlap with the screen of a display panel. Pixel density or Pixels Per Inch (PPI) may be lowered in a screen area overlapping with the camera module, and touch sensor wires that may cause interference of light incident on the camera module may be removed.

SUMMARY

Accordingly, the present disclosure has been made in an effort to address aforementioned necessities and/or drawbacks.

More specifically, the present disclosure is to provide a display panel, a display device, and a mobile terminal capable of implementing a full-screen display and capable of recognizing touch inputs in areas without touch sensors.

The problems to be solved by the present disclosure are not limited to those mentioned above, and other problems not mentioned will be clearly understood by those skilled in the art from the following description.

In an aspect of the present disclosure, a display panel includes a first pixel area where a plurality of light emitting elements and a plurality of pixel circuit are arranged; and a second pixel area where a plurality of light emitting devices are arranged. The second pixel area further may include a plurality of transparent extension lines configured to electrically connect the plurality of light emitting elements disposed in the second pixel area to the plurality of pixel circuits disposed in the first pixel area.

The plurality of pixel circuits may be configured to drive the plurality of light emitting elements disposed in the first and second pixel areas.

The first pixel area may include a boundary region with a predetermined size proximate to the second pixel area, the boundary region includes a first pixel circuit area in which pixel circuits configured to drive light emitting elements disposed in the second pixel area and pixel circuits configured to drive the light emitting elements disposed in the boundary region are disposed, and the first pixel area includes a second pixel circuit area that is spaced apart from the second pixel area and is configured to drive light emitting elements disposed in the remainder of the first pixel area except for the boundary region The plurality of transparent extension lines may include a first transparent extension lines configured to connect a first group of the light emitting elements disposed in the second pixel area to pixel circuits disposed in the first pixel circuit areas; and a second transparent extension lines configured to connect a second group of the light emitting elements disposed in the second pixel area to other pixel circuits disposed in the second pixel circuit area.

The second pixel area further may include a first insulating layer covering the first transparent extension lines; and a second insulating layer covering the second transparent extension lines and the first insulating layer. The first transparent extension lines may overlap with the second transparent extension lines with the first insulating layer interposed therebetween. Anode electrodes of the first group of light emitting elements may be connected to the first transparent extension lines via contact holes penetrating the first and second insulating layers. Anode electrodes of the second group of light emitting elements may be connected to the second transparent extension lines via contact holes penetrating the second insulating layer.

A density of the light emitting elements disposed in the second pixel area may be the same as a density of the light emitting elements disposed in the first pixel area.

In another aspect of the present disclosure, a display device includes a display panel as described above, the display panel including a plurality of touch sensors disposed in the first pixel area of the display panel; an optical sensor disposed below the second pixel area of the display panel and including a plurality of sensor pixels that photoelectrically convert incident light; a touch sensor driver configured to drive the touch sensors to output touch data indicating a touch input in the first pixel area; and an optical sensor driver configured to output touch data indicating a touch input in the second pixel area with light received through the second pixel area.

The touch sensors may have capacitance that varies according to a touch input. The optical sensor may be driven in a touch recognition mode when a touch input is detected in the boundary region of the first pixel area based on an output signal of the touch sensor driver.

Some of the sensor pixels of the optical sensor may be driven in the touch recognition mode.

Among the sensor pixels of the optical sensor, sensor pixels of a line of sensor pixels disposed along an imaginary extension line along which the touch sensors are disposed may be driven in the touch recognition mode.

Among the sensor pixels of the optical sensor, sensor pixels that may be spaced at an interval equal to the pitch between the neighboring touch sensors are driven.

In the optical sensor, all sensor pixels may be driven in at least one of a photographing mode and a face recognition mode.

In the touch recognition mode, the light emitting elements disposed in the second pixel area may be driven to emit light.

The display device may further comprise a host system configured to drive the touch sensors and the sensor pixels by controlling the touch sensor driver and the optical sensor driver, and to recognize the touch input in the first and second pixel areas by combining signals received from the touch sensor driver with signals received from the optical sensor driver in a touch recognition mode.

The host system may be configured to drive some of the sensor pixels of the optical sensor in the touch recognition mode.

The host system may be configured to start driving the optical sensor in the touch recognition mode when the touch input is detected in a boundary region of the first pixel area based on an output signal of the touch sensor driver.

The touch sensor driver may be configured to: perform a first touch scan on the touch sensors along a predetermined touch scan direction and output touch data indicating the touch input in the first pixel area; and pause the first touch scan while a second touch scan of the second pixel area is being performed by the optical sensor driver, and then resume the first touch scan after the second touch scan of the second pixel area is completed to output the touch data.

The optical sensor driver may be configured to scan some sensor pixels of the optical sensor when the touch input is sensed in the boundary region, and stop its driving after scanning of the part of sensor pixels is complete.

The host system may be configured to: compare the average luminance of the second pixel area with a predetermined reference value in the touch recognition mode; increase the luminance of the light emitting elements disposed in the second pixel area when the average luminance of the second pixel area is lower than the predetermined reference value; and drive some of the sensor pixels of the optical sensor.

A mobile terminal according to an aspect of the present disclosure comprises a display device as described above.

According to an aspect of the present disclosure, it may be possible to implement a display panel to increase the amount of light incident on the optical sensor disposed below the display panel and prevent light interference by configure a pixel area without pixel circuits.

According to an aspect of the present disclosure, it may be possible to implement a screen of the full-screen display by disposing the optical sensor under the display area of the display panel, and to provide various functions such as imaging, touch recognition, and face recognition using the optical sensor.

According to an aspect of the present disclosure, since there is no decrease in pixel density in the pixel area where the optical sensor is disposed, there is no difference in luminance between the pixel areas.

According to an aspect of the present disclosure, some sensor pixels in an optical sensor are driven in a touch recognition mode, so that touch sensitivity may be improved by an increase in a touch report rate, and unnecessary power consumption may be avoided, thereby driving the display device and the mobile terminal with lower power.

Effects which may be achieved by the present disclosure are not limited to the above-mentioned effects. That is, other features that are not mentioned may be obviously understood by those skilled in the art to which the present disclosure pertains from the following description.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
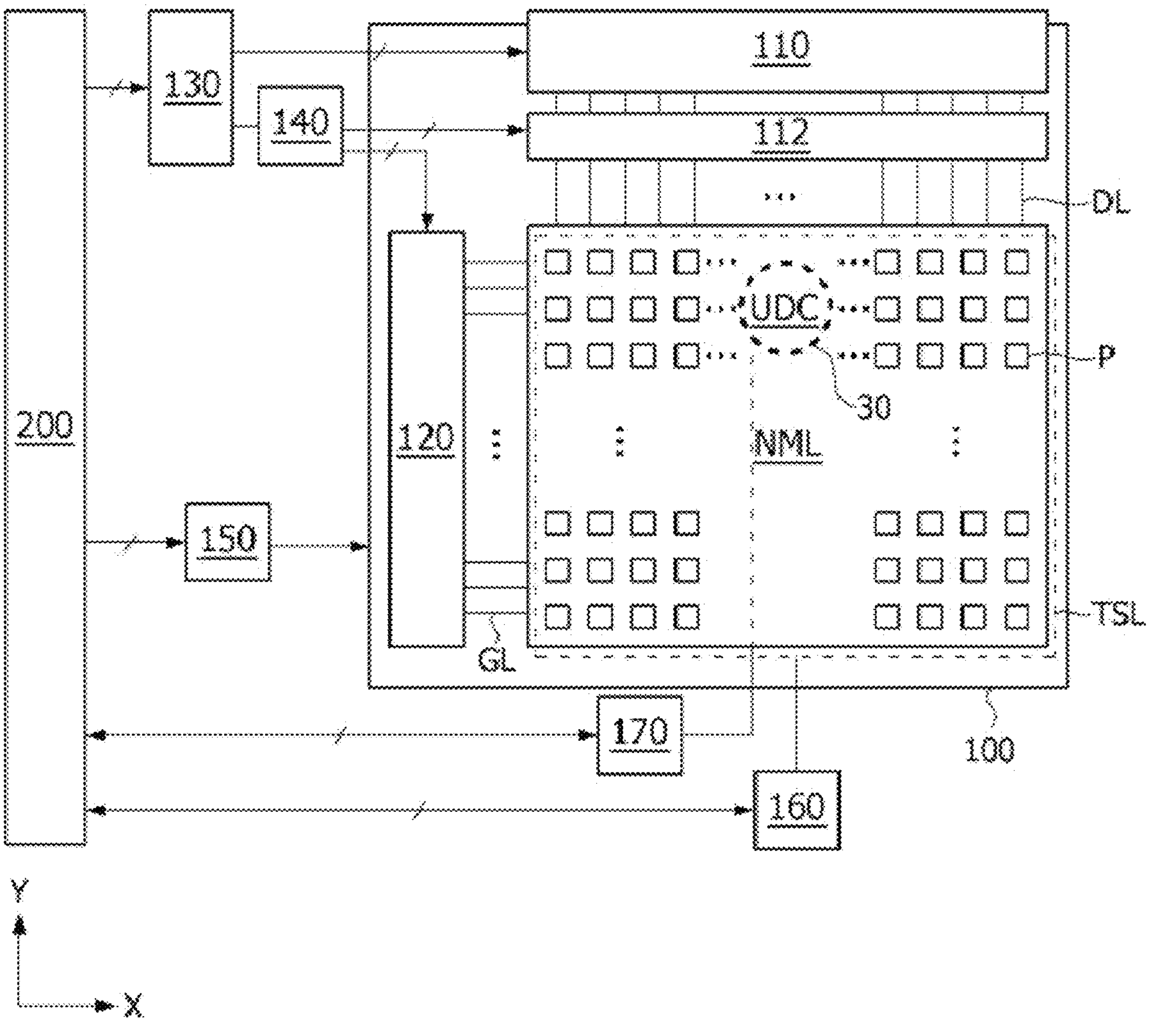
FIG. 1 is a block diagram illustrating a display device according to one aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following aspects may be partially or entirely bonded to or combined with each other and may be linked and operated in technically various ways. The aspects may be carried out independently of or in association with each other.

Hereinafter, various aspects of the present disclosure will be described in detail with reference to the accompanying drawings.

Figure 2:
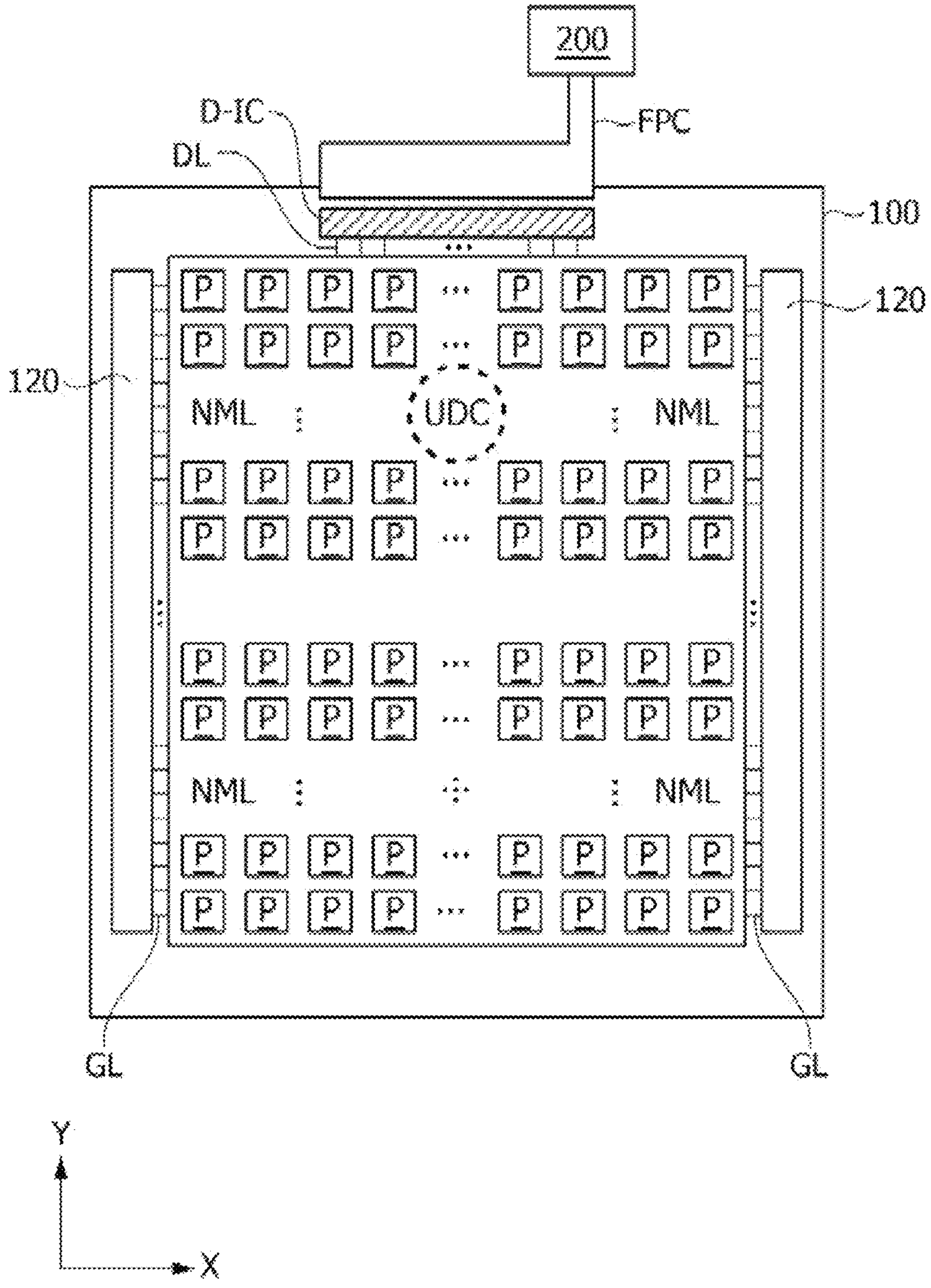
FIG. 2 is a block diagram illustrating a mobile terminal according to one aspect of the present disclosure.

FIG. 1 is a block diagram illustrating a display device according to one aspect of the present disclosure; FIG. 2 is a block diagram illustrating a mobile terminal according to one aspect of the present disclosure; and FIG. 3 is a cross-sectional view illustrating a cross-sectional structure of a display panel.

Figure 3:
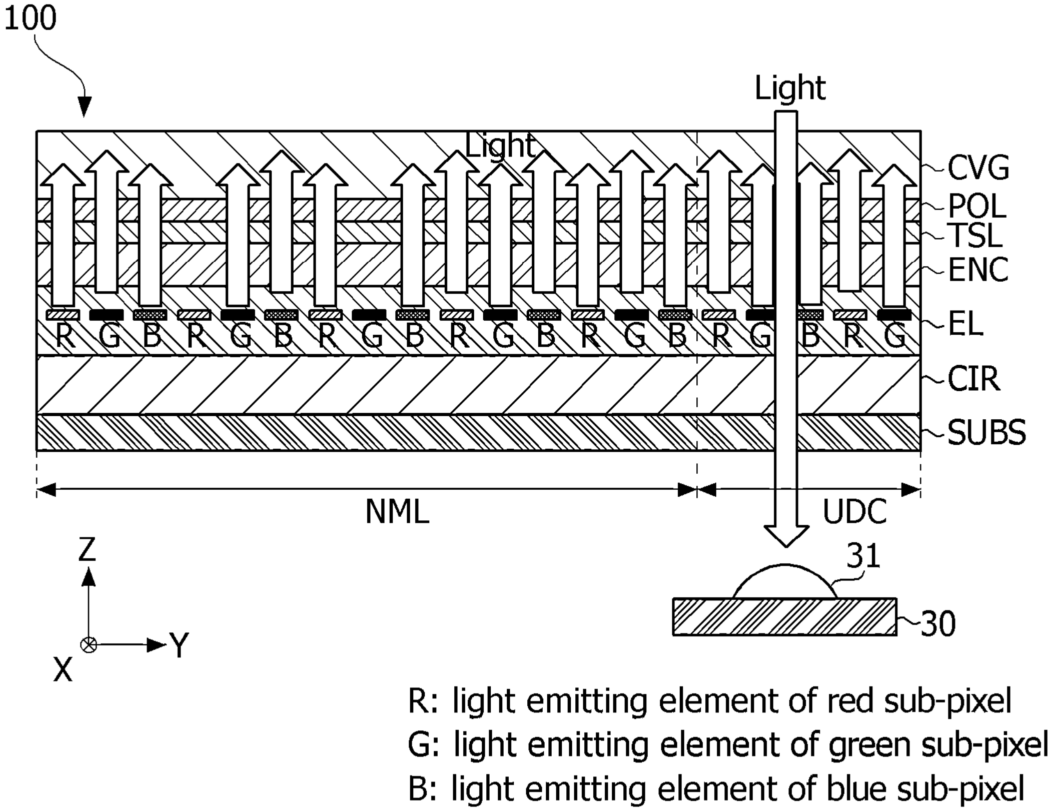
FIG. 3 is a cross-sectional view illustrating a cross-sectional structure of a display panel.

Referring to FIGS. 1 to 3, the display device according to an aspect of the present disclosure includes a display panel 100, a display panel driving circuit for writing pixel data to display pixels P in the display panel 100, and a power supply 150 for generating power necessary for driving the display pixels P and the display panel driving circuit. The display panel driving circuit may include several drivers and will be further described in more detail hereinafter.

The display panel 100 may be a panel having a rectangular structure with a length in the X-axis direction, a width in the Y-axis direction, and a thickness in the Z-axis direction. The display panel 100 may be implemented with a non-transmissive display panel or a transmissive display panel. The transmissive display panel may be applied to a transparent display device in which an image is displayed on a screen and an actual background is visible. The display panel 100 may be manufactured as a flexible display panel.

A display area of the display panel 100 includes a display pixel array that displays an input image. The display pixel array includes a plurality of data lines DL, a plurality of gate lines GL crossing the data lines DL, and display pixels P arranged in a matrix form. The display panel 100 may further include power lines commonly connected to the display pixels P. The gate lines GL may be formed long along a first direction, for example, an X-axis direction. The data lines DL may be formed long along a second direction, for example, a Y-axis direction. The power lines are connected to constant voltage nodes in pixel circuits to supply constant voltages needed to drive the display pixels P.

Each of the display pixels P may be divided into a red sub-pixel, a green sub-pixel, and a blue sub-pixel for color implementation. Each of the display pixels may further include a white sub-pixel. Each of the sub-pixels includes a pixel circuit for driving a light emitting element. Each of pixel circuits is connected to the data lines, the gate lines, and the power lines.

The light emitting element may be implemented as an organic light emitting device OLED. The light emitting element includes an anode electrode, a cathode electrode, and an organic compound layer formed between these electrodes. The organic compound layer may include, but is not limited to, a hole injection layer HIL, a hole transport layer HTL, a light emission layer EML, an electron transport layer ETL, and an electron injection layer EIL. When a voltage is applied to the anode and cathode electrodes of the light emitting element, the holes that have passed through the hole transport layer HTL and the electrons that have passed through the electron transport layer ETL are moved to the light emission layer EML, and excitons are formed. In this case, visible light is emitted from the light emission layer EML. The light emitting element may be implemented as a tandem structure with a plurality of light emitting layers stacked on top of each other. The light emitting element having the tandem structure may improve the luminance and lifespan of the display pixel.

The display pixel may be arranged as a real color pixel and a pentile pixel. The pentile pixel may realize a higher resolution than the real color pixel by driving two sub-pixels having different colors as one display pixel P through the use of a preset pixel rendering algorithm. The pixel rendering algorithm may compensate for insufficient color representation in each display pixel with the color of light emitted from an adjacent display pixel.

The display area of the display panel 100 includes a first pixel area NML and a second pixel area UDC. The pixel data of an input image is written to the display pixels P in the first pixel area NML and the second pixel area UDC so that the input image may be displayed in the display area of the display panel 100.

An optical sensor 30 may be disposed below the display panel 100. The optical sensor 30 may overlap with the second pixel area UDC. A lens 31 may be disposed on a receiving surface of the optical sensor 30. The optical sensor 30 may include one or more optical sensors, such as image sensors (or cameras), infrared light sources, infrared sensor elements, or illumination sensor elements. The optical sensor 30 may photoelectrically convert light reflected from an external photorealistic image in a photographing mode to capture an external photorealistic image, or may drive an infrared light source in a face recognition mode to photoelectrically convert infrared light reflected from a user's face to obtain features of the user's face. In addition, an image sensor of the optical sensor 30 is operated in a touch recognition mode under the control of the host system 200 to output touch data. Thus, the display device and the mobile terminal of the present disclosure may not only capture the external photorealistic image and recognize a face, but may also implement a screen of a full-screen display.

A display pixel density or pixels per inch (PPI) of the second pixel area UDC overlapping with the optical sensor 30 may be the same as that of the first pixel area NML. Therefore, the input image may be displayed in the display area of the display panel with a uniform image quality without a difference in resolution or luminance between the first and second pixel areas NML and UDC.

To increase the amount of light incident on the optical sensor 30 and prevent light interference, the second pixel area UDC includes light emitting elements of the display pixels without wires and electrodes of the touch sensor layer TSL. The wires and the electrodes of the touch sensor layer TSL may include highly reflective media such as metal, which may interfere with the light entering the optical sensor 30 or reduce the amount of light.

The cross-sectional structure of the display panel 100 may include a circuit layer CIR, a light emitting element layer EL, an encapsulation layer ENC, and a touch sensor layer TSL stacked on a substrate SUBS, as shown in FIG. 3.

The circuit layer CIR may include a TFT (thin-film transistor) array including a pixel circuit connected to wires such as a data line, a gate line, a power line, and the like, a de-multiplexer array 112, and a gate driver 120. The circuit layer CIR includes a plurality of metal layers insulated with insulating layers interposed therebetween, and a semiconductor material layer. The pixel circuit and the gate driver 120 may include a plurality of transistors. The transistors may be implemented as an oxide TFT (thin film transistor) including an oxide semiconductor, an LTPS TFT including a low temperature poly silicon (LTPS), and the like. Each of the transistors may be implemented with a p-channel TFT or an n-channel TFT. These transistors may be turned on in response to a gate-on voltage, whereas it may be turned off in response to a gate-off voltage.

The light emitting element layer EL includes a plurality of light emitting elements driven by the pixel circuit. The light emitting elements may include a light emitting element of a red sub-pixel, a light emitting element of a green sub-pixel, and a light emitting element of a blue sub-pixel. In FIG. 3, "R" is the light emitting element of red sub-pixels and "G" is the light emitting element of green sub-pixels. 'B' is the light emitting element of blue sub-pixels.

The light emitting element layer EL may further include a light emitting element of a white sub-pixel. The light emitting element layer EL may have a stacked structure of the light emitting elements and color filters. The light emitting elements disposed in the light emitting element layer EL may be covered by a multi-protective layer including an organic film and an inorganic film.

The encapsulation layer ENC covers the light emitting element layer EL to seal the circuit layer CIR and the light emitting element layer EL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic film and the inorganic film are laminated in multiple layers, the movement path of moisture and oxygen becomes longer than that of a single layer, and thus the penetration of moisture and oxygen affecting the light emitting element layer EL may be effectively blocked.

A touch sensor layer TSL is disposed on the encapsulation layer ENC. A polarizing plate POL or a color filter layer may be disposed over the touch sensor layer TSL.

The touch sensor layer TSL may include capacitive touch sensors that sense a touch input based on a change in capacitance before and after the touch input. Capacitive touch sensors are formed between wires. The touch sensor layer TSL may include metal wiring patterns and insulating films that form the capacitance of the touch sensors. The insulating films may insulate portions where the metal wiring patterns are intersected, and may planarize the surface of the touch sensor layer TSL.

The polarizing plate POL converts the polarization of external light reflected by the metal of the touch sensor layer TSL and the circuit layer to improve visibility and contrast ratio. The polarizing plate POL may be implemented with a polarizing plate in which a linear polarizing plate and a phase retardation film are bonded, or a circular polarizing plate. A cover glass CVG may be adhered to the polarizing plate.

The color filter layer (not shown) disposed on the touch sensor layer TSL may include red, green, and blue color filters. The color filter layer may further include a black matrix pattern. The color filter layer may replace the role of the polarizing plate POL by absorbing a portion of the wavelength of light reflected from the circuit layer CIR and the touch sensor layer TSL, and increase the color purity of an image reproduced in the display pixel array. If a color filter layer is placed above the touch sensor layer TSL, the polarizing plate POL may be omitted.

The power supply 150 generates a DC voltage (or a constant voltage) necessary for driving the display pixel array of the display panel 100 and the display panel driving circuit using a DC-DC converter. The DC-DC converter may include a charge pump, a regulator, a buck converter, a boost converter, and the like. The power supply 150 may adjust the level of the DC input voltage applied from the host system 200 to output a gamma reference voltage, a constant voltage commonly applied to the display pixels P, a gate-on voltage, a gate-off voltage, and the like. The gamma reference voltage is supplied to the data driver 110. The dynamic range of the data voltage outputted from the data driver 110 is determined by the voltage range of the gamma reference voltage. The gate-on voltage and the gate-off voltage are supplied to a level shifter 140 and the gate driver 120.

The display panel driving circuit writes pixel data of an input image to the display pixels of the display panel 100 under the control of the timing controller 130. The display panel driving circuit includes the data driver 110, the gate driver 120, and a touch sensor driver 160. The display panel driving circuit may further include a de-multiplexer array 112 disposed between the data driver 110 and the data lines DL.

The data driver 110 receives pixel data of the input image received as a digital signal from the timing controller 130 and outputs a data voltage. The data driver 110 outputs the data voltage by converting the pixel data of the input image into a gamma compensation voltage using a digital-to-analog converter (DAC). A gamma reference voltage VGMA is divided by a voltage divider circuit into a gray-scale-wise gamma compensation voltage. The grayscale-wise gamma compensation voltage is provided to the DAC in the data driver 110. The data voltage is outputted via an output buffer from each of the channels of the data driver 110.

The de-multiplexer array 112 sequentially supplies the data voltages outputted from channels of the data driver 110 to the data lines DL using a plurality of de-multiplexers DEMUX. The de-multiplexer may include a multiple of switch elements disposed on the display panel 100. When the de-multiplexer is disposed between the output terminals of the data driver 110 and the data lines DL, the number of channels of the data driver 110 may be reduced. The de-multiplexer array 112 may be omitted.

The gate driver 120 may be formed in the circuit layer CIR on the display panel 100 together with the TFT array and the wires of the display pixel array. The gate driver 120 may be disposed in a bezel area, which is non-display area of the display panel 100, or may be distributedly disposed in a display pixel array in which an input image is reproduced.

The gate driver 120 may be disposed in the bezel area on opposite sides of the display panel 100 with the display area of the display panel 100 interposed therebetween and may supply gate pulses from opposite sides of the gate lines GL in a double feeding method. In another aspect, the gate driver 120 may be disposed in either the left or right bezel area of the display panel 100 to supply gate signals to the gate lines GL in a single feeding method. The gate driver 120 sequentially outputs pulses of the gate signals to the gate lines GL under the control of the timing controller 130. The gate driver 120 may sequentially supply the gate signals to the gate lines GL by shifting pulses of the gate signals using a shift register.

The data driver 110 and the touch sensor driver 160 may be integrated into one drive IC (Integrated Circuit). In a mobile terminal or a wearable terminal, the timing controller 130, the power supply 150, the level shifter 140, the data driver 110, the touch sensor deriver 160, and the like may be integrated into one drive IC (D-IC) as shown in FIG. 2.

The touch sensor layer TSL includes driving wires and sensing wires which are intersected, driving electrodes, and sensing electrodes. A capacitance is formed between the driving wires and the sensing wires. The wires of the touch sensor layer TSL are disposed in a first pixel area NML except for a second pixel area UDC. The structure of the touch sensor layer TSL will be described in more detail with reference to FIGS. 4 and 5.

The touch sensor driver 160 contains analog circuitry, digital circuitry, and a coordinate calculator. A drive signal is applied to the driving wires to charge the capacitance formed between the wires of the touch sensor layer TSL. The analog circuitry amplifies the voltage of the sensing wires using an amplifier and integrator to sense the change in capacitance before and after a touch input. The digital circuitry converts the analog touch sensing value outputted from the analog circuitry to digital data using an analog-to-digital converter (ADC) to output touch raw data, and compares the touch raw data to a predetermined reference value. The touch coordinate calculator calculates the coordinate value of the raw touch data that is greater than the predetermined reference value and outputs touch data including coordinate information of each touch input. The touch data outputted from the touch sensor driver 160 is transmitted to the host system 200. The higher the frequency at which the touch data is transmitted, i.e., the higher the touch report rate, the faster the host system 200 may recognize the touch input. Thus, the higher the touch report rate, the more the sensitive of the touch input.

The timing controller 130 receives from the host system 200 digital video data of an input image and timing signals synchronized with the video data. The timing signals may include a vertical synchronization signal Vsync, a horizontal synchronization signal Hsync, a clock CLK, and a data enable signal DE. Because a vertical period (or frame period) and a horizontal period may be known by counting the data enable signal DE, the vertical synchronization signal Vsync and the horizontal synchronization signal Hsync may be omitted. The data enable signal DE has a cycle of one horizontal period (1H).

The timing controller 130 generates a data timing control signal for controlling the operation timing of the data driver 110, a de-multiplexer control signal for controlling the operation timing of the de-multiplexer array 112, and a gate timing control signal for controlling the operation timing of the gate driver 120, based on the timing signals received from the host system 200. The timing controller 130 synchronizes the data driver 110, the de-multiplexer array 112, the touch sensor driver 160, and the gate driver 120 by controlling the operation timing of the display panel driving circuit.

The gate timing control signal generated from the timing controller 130 may be inputted to the shift register of the gate driver 120 via the level shifter 140. The level shifter 140 may receive the gate timing control signal and generate a start pulse and a shift clock to provide them to the gate driver 120. The level shifter 140 may increase the swing width of the de-multiplexer control signal at the digital signal level inputted from the timing controller 130 to the voltage between the gate-on voltage and the gate-off voltage to provide it to the de-multiplexer array 112.

The host system 200 may include a main board of any one of a television (TV) system, a navigation system, a personal computer (PC), a vehicle system, a mobile terminal, and a wearable terminal. The host system may scale an image signal from a video source to match the resolution of the display panel 100, and may transmit it to the timing controller 130 together with the timing signal.

In a mobile system, the host system 200 may be implemented with an application processor (AP). The host system 200 may transmit pixel data of an input image to a drive IC (D-IC) via a mobile industry processor interface (MIPI). The host system 200 may be connected to the drive IC (D-IC) via a flexible printed circuit, for example, a flexible printed circuit (FPC), as shown in FIG. 2. The drive IC may be attached on the display panel 100 in a COG (Chip on Glass) process.

The host system 200 may execute an application program corresponding to the coordinate value at which the touch input is detected in response to the touch data received from the touch sensor driver 160.

The display panel driving circuit further includes an optical sensor driver 170. The optical sensor driver 170 is operated under the control of the host system 200 to drive the optical sensor 30 in a photographing mode, a face recognition mode, and a touch recognition mode. The optical sensor 30 includes a plurality of sensor pixels to output photoelectric conversion signals in the photographing mode, the face recognition mode, and the touch recognition mode. Each of the sensor pixels includes a photoelectric conversion element, such as a photodiode, to output an electrical signal when light is received. The sensor pixels may be CCD or CMOS sensor pixels.

The host system 200 converts the data received from the optical sensor 30 in the photographing mode into graphical image data. In the face recognition mode, the host system 200 processes user authentication by comparing feature point data received from the optical sensor 30 with the pre-stored face data of the user. In the touch recognition mode, the host system 200 determines whether there is a touch input and its location based on the touch data received from the touch sensor driver 160 and the touch data received from the optical sensor driver 170.

Figure 4:
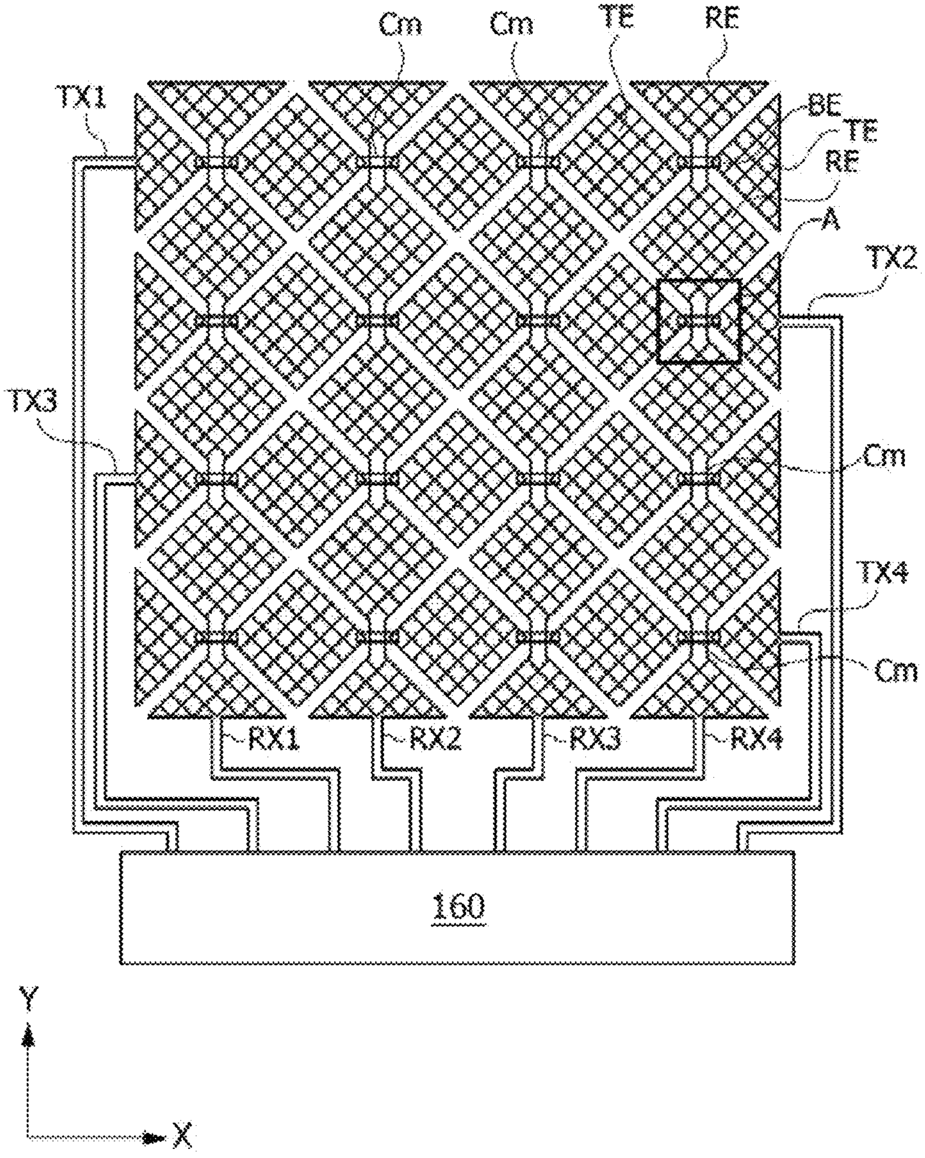
FIG. 4 is a diagram illustrating a wiring structure of a touch sensor layer.
Figure 5:
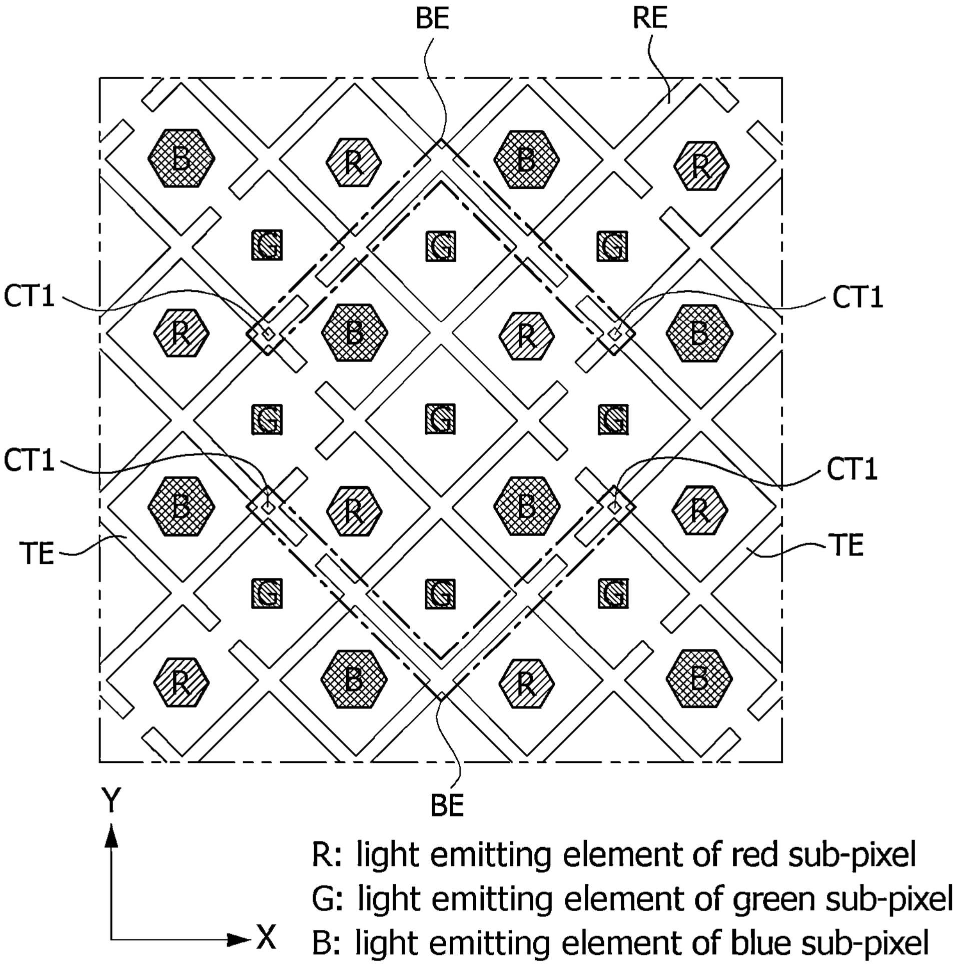
FIG. 5 is an enlarged view of portion 'A' in FIG. 4.

FIG. 4 is a diagram illustrating a wiring structure of a touch sensor layer TSL. FIG. 5 is an enlarged view of portion 'A' in FIG. 4.

Referring to FIGS. 4 and 5, the touch sensor layer TSL includes touch sensors Cm at which driving wires TX1 to TX4 and sensing wires RX1 to RX4 are intersected and which is formed between the driving wires TX1 to TX4 and the sensing wires RX1 to RX4.

The driving wires TX1 to TX4 include a plurality of first electrodes TE disposed along a first direction, for example, the X-axis direction. The first electrodes are spaced apart from each other and electrically connected with a predetermined interval therebetween. The sensing wires RX1 through RX4 include a plurality of second electrodes RE disposed along a second direction intersecting the first direction, e.g., the Y-axis direction. The second electrodes are spaced apart from each other and electrically connected with a predetermined interval therebetween. A first electrode TE is disposed between two neighboring second electrodes RE.

Each of the first and second electrodes TE and RE may have, but is not limited to, a rhombus shape or a diamond shape on the same plane. The first electrodes TE and the second electrodes RE may be formed on the same plane in a metal mesh pattern having low electrical resistance.

In FIG. 5, "R" is the light emitting elements of red sub-pixels and "G" is the light emitting elements of green sub-pixels. 'B' is the light emitting elements of blue sub-pixels. The metal mesh pattern of the first electrodes TE and the second electrodes RE do not overlap with the light emitting elements R, G, or B of sub-pixels. Accordingly, the wires of the touch sensor layer TSL does not interfere with the light traveling from the sub-pixels toward the user.

Neighboring first electrodes TE may be electrically connected via a conductive bridge pattern BE. Neighboring second electrodes RE may be integrated through a connection without the bridge pattern BE. The bridge pattern BE connects the neighboring first electrodes TE across the connection between the neighboring second electrodes RE with an insulating layer therebetween.

Capacitance serving as a touch sensor is formed in each intersecting region between the first electrodes TE and the second electrodes RE. The bridge patterns BE electrically connect the neighboring first electrodes TE via contact holes CT1 penetrating the insulating layer. The bridge patterns BE overlaps with the metal mesh patterns at the boundaries between the first and second electrodes TE and RE, respectively, and do not overlap with the light emitting elements of the sub-pixels, respectively.

The touch sensor driver 160 applies a driving signal to the driving wires TX1 to TX4 to charge the capacitance of the touch sensor Cm, and detects the touch input by sensing the amount of change in charge on the capacitance of the touch sensor Cm before and after the touch input through the sensing wires RX1 to RX4.

Figure 6:
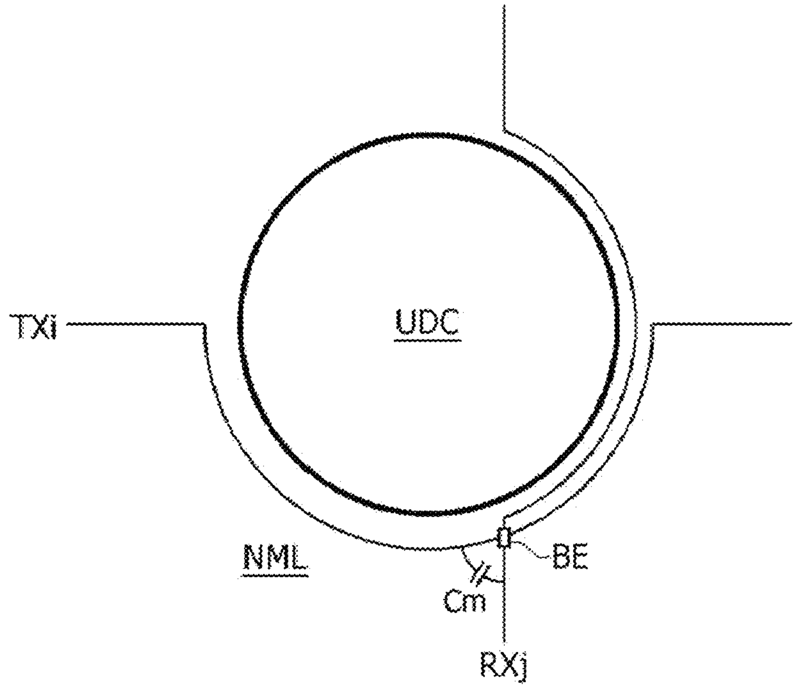
FIG. 6 is a diagram illustrating an example in which wires in a touch sensor includes a curve pattern bypassing a second pixel area.

The driving wires TX1, TX2 and the sensing wires RX1, RX2 in the touch sensor layer TSL are disposed in the first pixel area NML instead of the second pixel area UDC so as not to interfere with the incident light upon the optical sensor 30. The driving wires TX1, TX2 and the sensing wires RX1, RX2 may include a curved pattern that bypasses the second pixel area UDC instead of crossing it, as illustrated in FIG. 6. In FIG. 6, "TXi" represents an arbitrary driving wires bypassing the second pixel area UDC and "RXj" represents an arbitrary sensing wires bypassing the second pixel area UDC.

Figure 7:
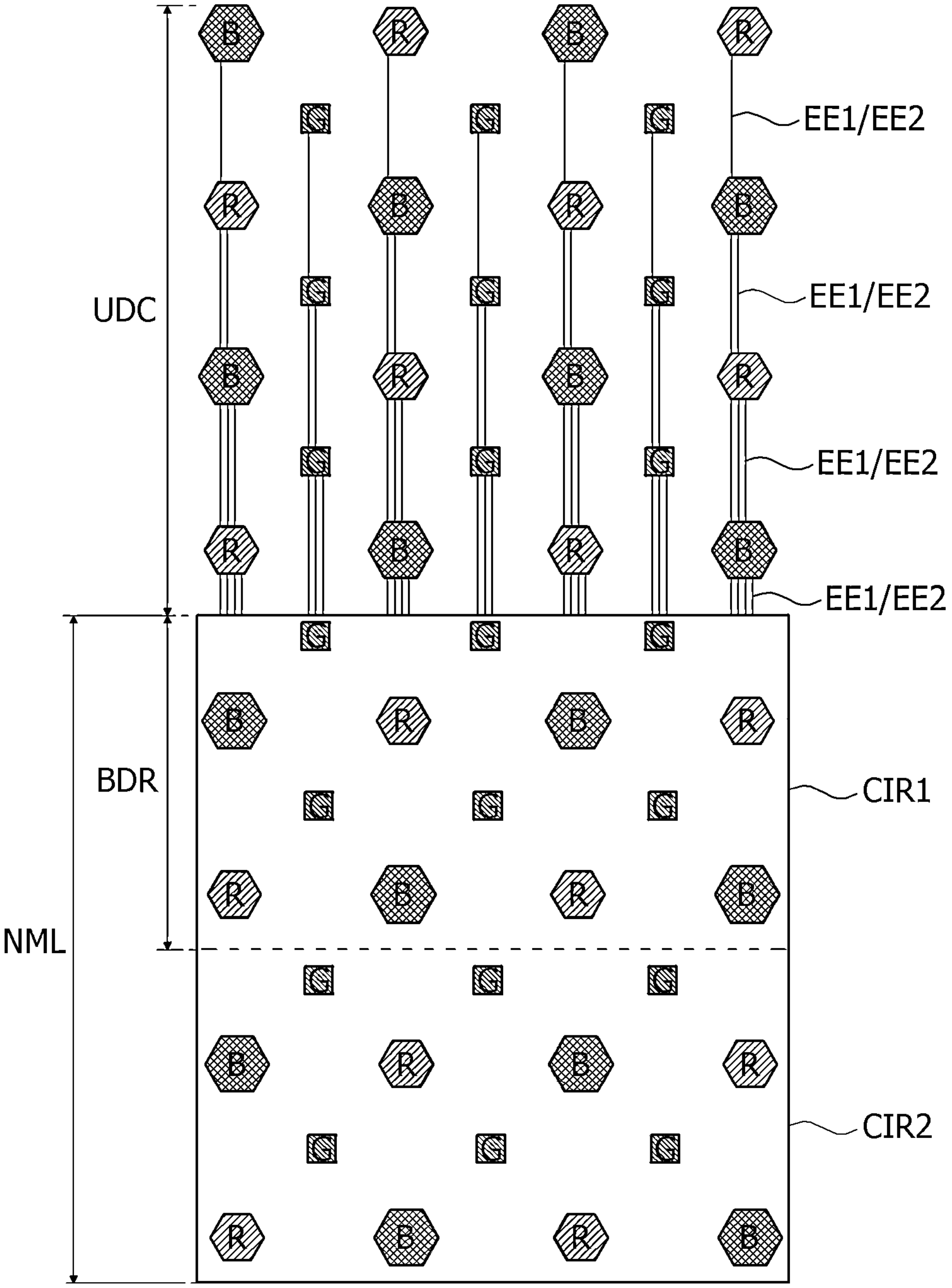
FIG. 7 is a plan view illustrating light emitting elements in a first and second pixel areas.
Figure 8:
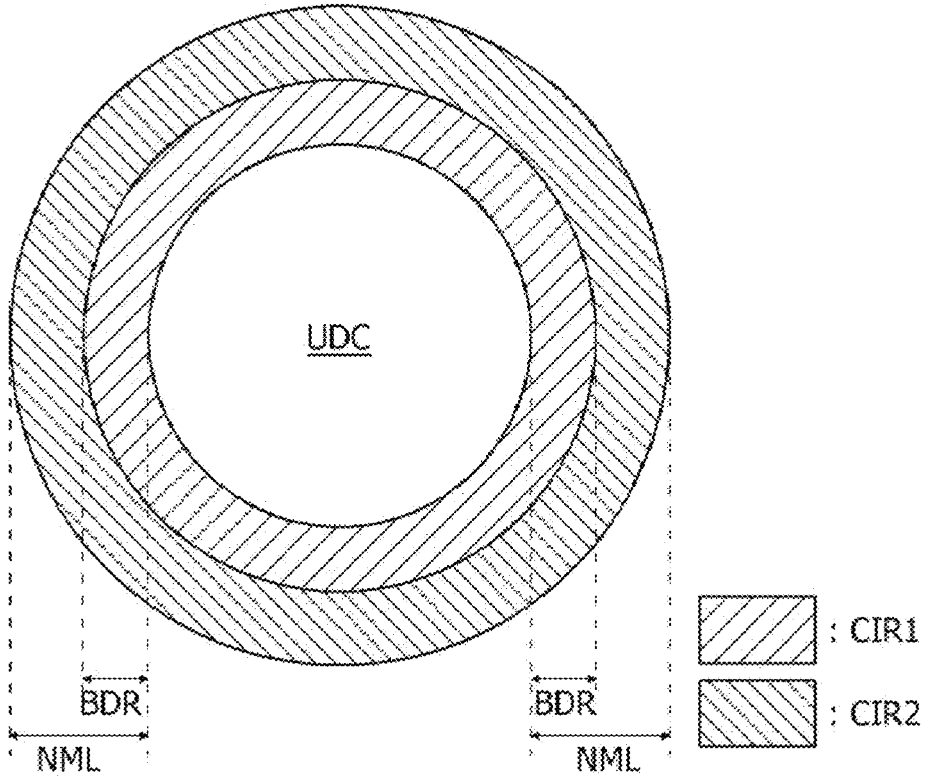
FIG. 8 is a plan view illustrating pixel circuit areas around a second pixel area.

FIG. 7 is a plan view illustrating light emitting elements of the first pixel area and the second pixel area. FIG. 8 is a plan view illustrating pixel circuit areas around the second pixel area.

Referring to FIGS. 7 and 8, the first pixel area NML includes a plurality of light emitting elements R, G, and B and a pixel circuit area. The second pixel area UDC includes the plurality of light emitting elements R, G, and B without the pixel circuit area. The display pixel density or PPI of the light emitting elements R, G, and B disposed in the first and second pixel areas NML and UDC is substantially the same and the color arrangement thereof is also the same.

The pixel circuit area includes a first pixel circuit area CIR1 adjacent to the second pixel area UDC, and a second pixel circuit area CIR2 spaced apart from the second pixel area UDC with the first pixel circuit area CIR1 interposed therebetween.

The first pixel area NML includes a boundary region BDR having a predetermined size proximate to the second pixel area NML. The first pixel circuit area CIR1 is disposed in the boundary region BDR.

The first pixel circuit area CIR1 includes a plurality of pixel circuits for driving the light emitting elements R, G, and B disposed in the second pixel area UDC, and a plurality of pixel circuits for driving the light emitting elements R, G, and B disposed in the first pixel circuit area CIR1. At least some of the pixel circuits in the first pixel circuit area CIR1 are connected to the light emitting elements R, G, and B disposed in the second pixel area UDC via transparent extension lines (EE1/EE2, as shown in FIG. 7). The transparent extension lines may be formed of transparent electrode materials, such as ITO (Indium-Tin Oxide), and IZO (Indium-Zinc Oxide), etc.

In the second pixel circuit area CIR2, a plurality of pixel circuits that drive the light emitting elements R, G, and B disposed in the remainder of the first pixel area NML excluding the boundary region BDR are disposed.

Each of the pixel circuits disposed in the first and second pixel circuit areas CIR1 and CIR2 may include an internal compensation circuit. There may be differences in the electrical characteristics of a driving elements in the display pixels due to process deviations and device characteristics deviations resulting from the manufacturing process of the display panel. These differences may increase as the driving time of the display pixels elapses. The internal compensation circuit may sample the threshold voltage of the driving element and compensate the gate voltage of the driving element by the threshold voltage of the driving element.

Figure 9:
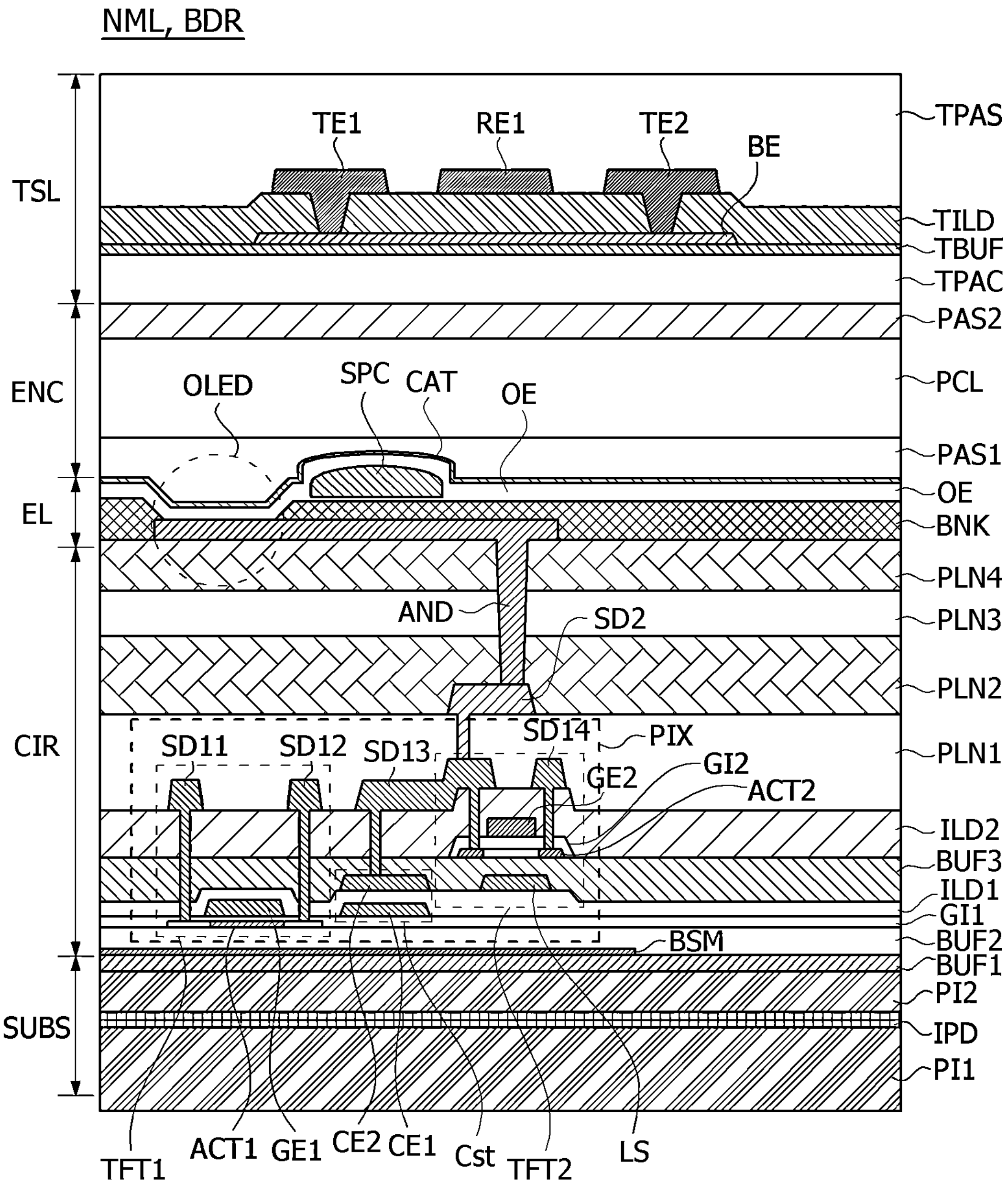
FIG. 9 is a cross-sectional view showing a cross-sectional structure of a first pixel area in a display panel.
Figure 10:
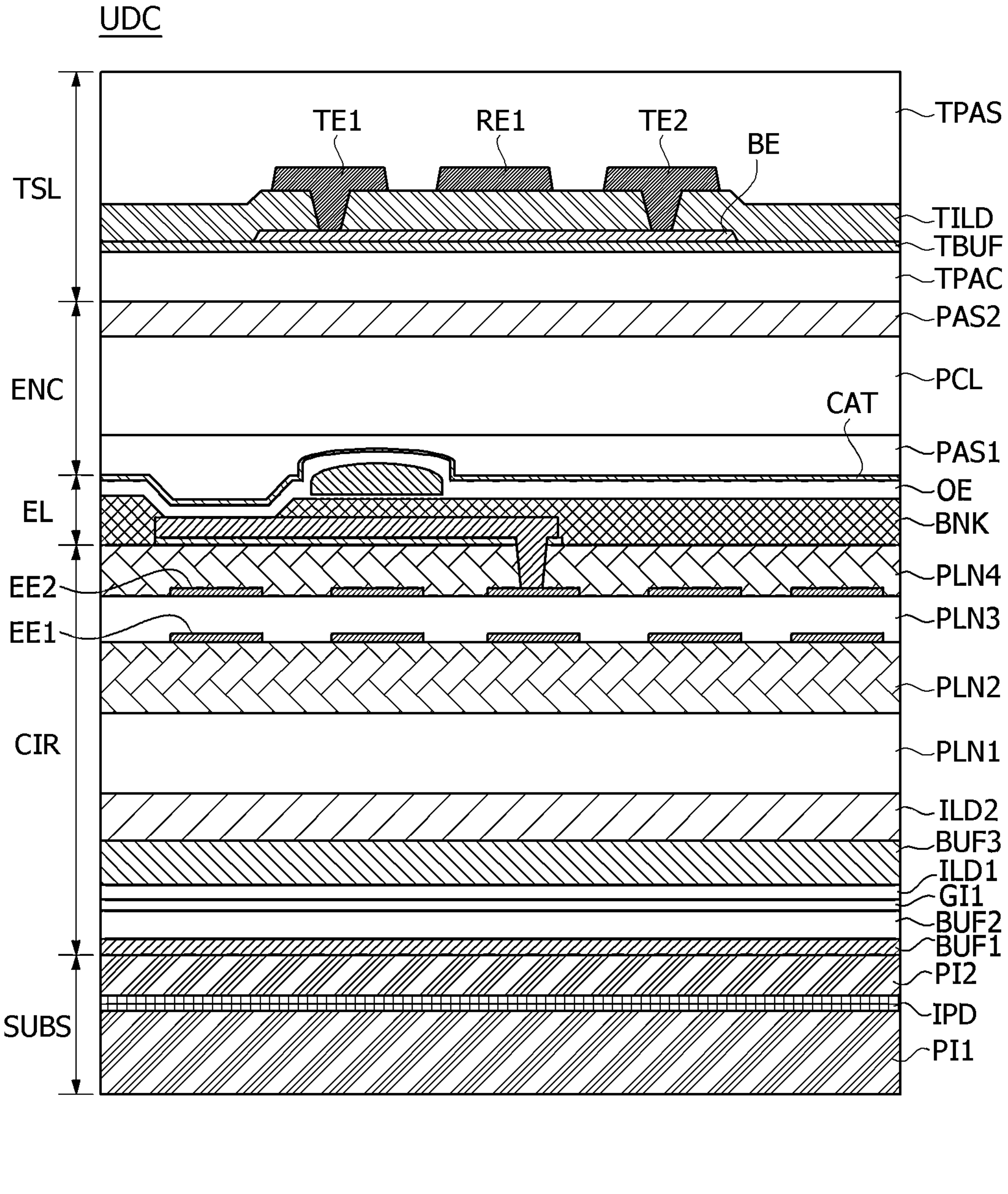
FIG. 10 is a cross-sectional view showing a cross-sectional structure of a second pixel area in a display panel.

FIG. 9 is a cross-sectional view showing a cross-sectional structure of a first pixel area in a display panel. FIG. 10 is a cross-sectional view showing a cross-sectional structure of a second pixel area in a display panel.

Referring to FIGS. 9 and 10, a substrate SUBS may be a transparent glass or a plastic substrate. For example, the substrate SUBS may be fabricated as a stacked structure of a first polyimide (hereinafter referred to as "PI") substrate PI1, an inorganic film IPD, and a second PI substrate PI2. The inorganic film IPD blocks moisture penetration.

The circuit layer CIR of the first pixel area NML includes a pixel circuit PIX that drives a light emitting element, e.g., OLED. The pixel circuit PIX includes a plurality of TFTs TFT1 and TFT2 and a storage capacitor Cst that are made of a plurality of metal and semiconductor layers.

The thin film structure of the circuit layer CIR of the first pixel area NML includes a first buffer layer BUF1; a first metal layer disposed on the first buffer layer BUF1; a second buffer layer BUF2 covering the first metal layer and the first buffer layer BUF1; a first semiconductor layer disposed on the second buffer layer BUF2; a first gate insulation layer GI1 covering the first semiconductor layer and the second buffer layer BUF2; a second metal layer disposed on the first gate insulating layer GI1; a first interlayer insulating layer ILD1 covering the second metal layer and the first gate insulating layer GI1; a third metal layer disposed on the first interlayer insulating layer ILD1; a third buffer layer BUF3 covering the third metal layer and the first interlayer insulating layer ILD1; a second semiconductor layer disposed on the third buffer layer BUF3; a second gate insulating layer GI2 covering a second semiconductor active pattern ACT2 of the second semiconductor layer; a fourth metal layer disposed on the second gate insulating layer GI2; a second interlayer insulating layer ILD2 covering the fourth metal layer, the second gate insulating layer GI2, and the third buffer layer BUF3; a fifth metal layer disposed on the second interlayer insulating layer ILD2; a first planarization layer PLN1 covering the fifth metal layer and the second interlayer insulation layer ILD2; a sixth metal layer disposed on the first planarization layer PLN1; a second planarization layer PLN2 covering the sixth metal layer and the first planarization layer PLN1; a third planarization layer PLN3 covering the second planarization layer PLN2; and a fourth planarization layer PLN4 covering the third planarization layer PLN3.

The first buffer layer BUF1 may be formed on the glass substrate SUBS. The first buffer layer BUF1 includes a single or multiple layers of inorganic insulating material. The inorganic insulating material layer may be a silicon oxide (SiOx) or silicon nitride (SiNx) film.

The first metal layer includes a single layer metal or a metal pattern with two or more metal layers stacked. The first metal layer may include a light shield pattern BSM disposed under the TFTs constituting the pixel circuit.

The first semiconductor layer is formed on the second buffer layer BUF2. The second buffer layer BUF2 includes a single or multiple layers of inorganic insulating material. The first semiconductor layer may include a polysilicon semiconductor layer. The first semiconductor layer may include a first semiconductor active pattern ACT1 of a first TFT TFT1 utilized as a switch element of the pixel circuit. The first TFT TFT1 may be an LTPS TFT.

The first gate insulation layer GI1 covers the first semiconductor active pattern ACT1 of the first semiconductor layer and the second buffer layer BUF2 to isolate the second semiconductor layer and the second metal layer. The first gate insulation layer GI1 includes an inorganic insulating material layer.

The second metal layer is formed on the first gate insulation layer GI1. The second metal layer includes a single layer metal or a metal pattern with two or more metal layers stacked. The second metal layer may include the gate electrode GE1 of the first TFT TFT1 and the first electrode CE1 of the storage capacitor Cst. The gate electrode GE1 of the first TFT TFT1 overlaps with the first semiconductor active pattern ACT1 with the first gate insulating layer GI1 interposed therebetween.

The first interlayer insulation layer ILD1 covers the second metal layer and the first gate insulation layer GI1. The first interlayer insulation layer ILD1 includes a layer of inorganic insulating material. The third metal layer is formed on the first interlayer insulation layer ILD1. The third metal layer includes a second electrode CE2 of the storage capacitor Cst and a back gate electrode LS located under the second TFT TFT2. The back gate electrode LS may be floating or a preset voltage may be applied to it. When a voltage is applied to the back gate electrode LS, the second TFT TFT2 may operate as a double gate TFT.

The third buffer layer BUF3 covers the third metal layer and the first interlayer insulation layer ILD1. The third buffer layer BUF3 includes a single or multiple layers of inorganic insulating material. The second semiconductor layer is formed on the third buffer layer BUF3. The second semiconductor layer may include an oxide semiconductor layer. The second semiconductor layer may include a second semiconductor active pattern ACT2 of a second TFT TFT2 utilized as a driving element of the pixel circuit. The second TFT TFT2 may be an oxide TFT.

The second gate insulation layer GI2 covers the second semiconductor active pattern ACT2 of the second semiconductor layer. The second gate insulating layer GI2 includes a single or multiple layers of inorganic insulating material. The fourth metal layer is formed on the second gate insulation layer GI2. The fourth metal layer includes a gate electrode GE2 of the second TFT TFT2 overlapping with the second semiconductor active pattern ACT2 with the second gate insulating layer GI2 interposed therebetween.

The second interlayer insulation layer ILD2 covers the fourth metal layer, the second gate insulation layer GI2, and the third buffer layer BUF3. The second interlayer insulating layer ILD2 includes a single or multiple layers of inorganic insulating material. The fifth metal layer is formed on the second interlayer insulation layer ILD2. The fifth metal layer includes source and drain electrodes SD11, SD12, SD13, and SD14 of the first and second TFTs TFT1 and TFT2. The source and drain electrodes SD11 and SD12 of the first TFT TFT1 are contacted on opposite sides of the first semiconductor active pattern ACT1 via contact holes penetrating the second interlayer insulation layer ILD2, the third buffer layer BUF3, the first interlayer insulation layer ILD1, and the first gate insulation layer GI1. The source and drain electrodes SD13 and SD14 of the second TFT TFT2 are contacted on opposite sides of the second semiconductor active pattern ACT2 via contact holes penetrating the second interlayer insulation layer ILD2 and the second gate insulation layer GI2. In addition, the source electrode SD13 of the second TFT TFT2 is connected to the second electrode CE2 of the storage capacitor Cst via contact holes penetrating the second interlayer insulation layer ILD2 and the third buffer layer BUF3.

The first planarization layer PLN1 covers the fifth metal layer and the second interlayer insulation layer ILD2. The first planarization layer PLN1 includes an organic insulating material. The sixth metal layer is formed on the first planarization layer PLN1. The sixth metal layer includes a second source electrode SD2, which is in contact with the source electrode SD13 of the second TFT TFT2 via a contact hole penetrating the first planarization layer PLN1.

The second planarization layer PLN2 covers the sixth metal layer and the first planarization layer PLN1. The third planarization layer PLN3 covers the second planarization layer PLN2. The fourth planarization layer PLN4 covers the third planarization layer PLN3. The second to fourth planarization layers PLN2, PLN3, and PLN4 include an organic insulating material.

The circuit layer CIR of the second pixel area UDC includes transparent extension lines and transparent insulating layers BUF1 and BUF2, GI1, ILD1, BUF3, ILD2, and PLN1 to PLN4 without TFTs TFT1 and TFT2 and the capacitor Cst.

At least two of the transparent extension lines connected to the light emitting elements of the second pixel area may overlap with each other. For example, the transparent extension lines include a plurality of first transparent extension lines EE1 disposed on the second planarization layer PLN2 and a plurality of second transparent extension lines EE2 disposed on the third planarization layer PLN3. The first transparent extension lines EE1 overlap with the second transparent extension lines EE2 with the third planarization layer PLN3 interposed therebetween. It should be noted the first transparent extension lines EE1 may not overlap with the second transparent extension lines EE2. The first transparent extension lines EE1 are connected one-to-one to a first group of light emitting elements OLED disposed in the second pixel area UDC and connected to the pixel circuit PIX disposed in the first pixel area NML. The second transparent extension lines EE2 are connected one-to-one to a second group of light emitting elements OLED disposed in the second pixel area UDC and connected to the pixel circuit PIX disposed in the first pixel area NML. The third planarization layer PLN3 isolates the first transparent extension lines EE1 and the second transparent extension lines EE2.

The light emitting element layer EL of each of the first and second pixel areas NML and UDC includes a plurality of light emitting elements OLED. The light emitting elements OLED include the light emitting element R of red sub-pixel, the light emitting element G of green sub-pixel, and the light emitting element B of the blue sub-pixel, as shown in FIG. 7. The arrangement and density of the light emitting elements in the first and second pixel areas NML and UDC are substantially the same.

The light emitting elements OLED disposed in the second pixel area UDC are connected to one of the first and second transparent extension lines EE1 and EE2.

The light emitting element layer EL includes an anode electrode AND disposed on the fourth planarization layer PLN4, a bank pattern BNK covering a portion of the anode electrode AND, a spacer SPC disposed on the bank pattern BNK), an organic compound layer OE covering the anode electrode AND and the bank pattern BNK, and a cathode electrode CAT covering the organic compound layer OE.

The anode electrode AND of the light emitting element OELD is connected to the second transparent extension line EE2 via a contact hole penetrating the fourth planarization layer PLN4, or to the first transparent extension line EE1 via a contact hole penetrating the third and fourth planarization layers PLN3 and PNL4. For example, an anode electrode AND of the first group of light emitting elements OLED disposed in the second pixel area UDC may be connected to the first transparent extension lines EE1 via contact holes penetrating the third and fourth planarization layers PNL3 and PNL4, and an anode electrode AND of a second group of light emitting elements OLED disposed in the second pixel area UDC may be connected to the second transparent extension lines EE2 via a contact hole penetrating the fourth planarization layer PLN4.

The bank pattern BNK and the spacer SPC may be patterned with a photosensitive organic insulating material. The light emitting area of the light emitting element OLED between the sub-pixels is separated by the bank pattern BNK. The organic compound layer OE may be an organic compound with a stacked structure of a hole-injection layer HIL, a hole-transport layer HTL, an emission layer EML, an electron-transport layer ETL, and an electron-injection layer EIL, or a tandem structure including a plurality of emission layers EML.

The encapsulation layer ENC seals the light emitting element layer EL of the first and second pixel areas NML and UDC. The encapsulation layer ENC includes a first protective layer PAS1 covering the cathode electrode CAT, an organic insulating layer PCL covering the first protective layer PAS1, and a second protective layer PAS2 covering the organic insulating layer PCL. The first and second protective layers PAS1 and PAS2 are a single or multiple layers of inorganic material. The organic insulation layer PCL is an organic insulating material layer.

The touch sensor layer TSL includes a first insulating layer TPAC covering the second protective layer PAS2, a second insulating layer TBUF covering the first insulating layer TPAC, a bridge pattern BE disposed on the second insulating layer TBUF, a third insulating layer TILD covering the bridge pattern BE and the second insulating layer TBUF, first and second electrodes TE1, TE2, RE1 of the touch sensor Cm disposed on the third insulating layer TILD, and a fourth insulating layer TPAS covering the electrodes TE1, TE2, RE1 of the touch sensor Cm and the third insulating layer TILD.

The first insulating layer TPAC is an organic insulating material layer. The second and third insulating layers TBUF and TILD are inorganic insulating material layers. The fourth insulating layer TPAS is an inorganic or organic insulating material layer. The bridge pattern BE is a metal pattern with low resistance. Neighboring first electrodes TE1 and TE2 are connected to the bridge pattern BE via contact holes through the third insulating layer TILD.

Figure 11:
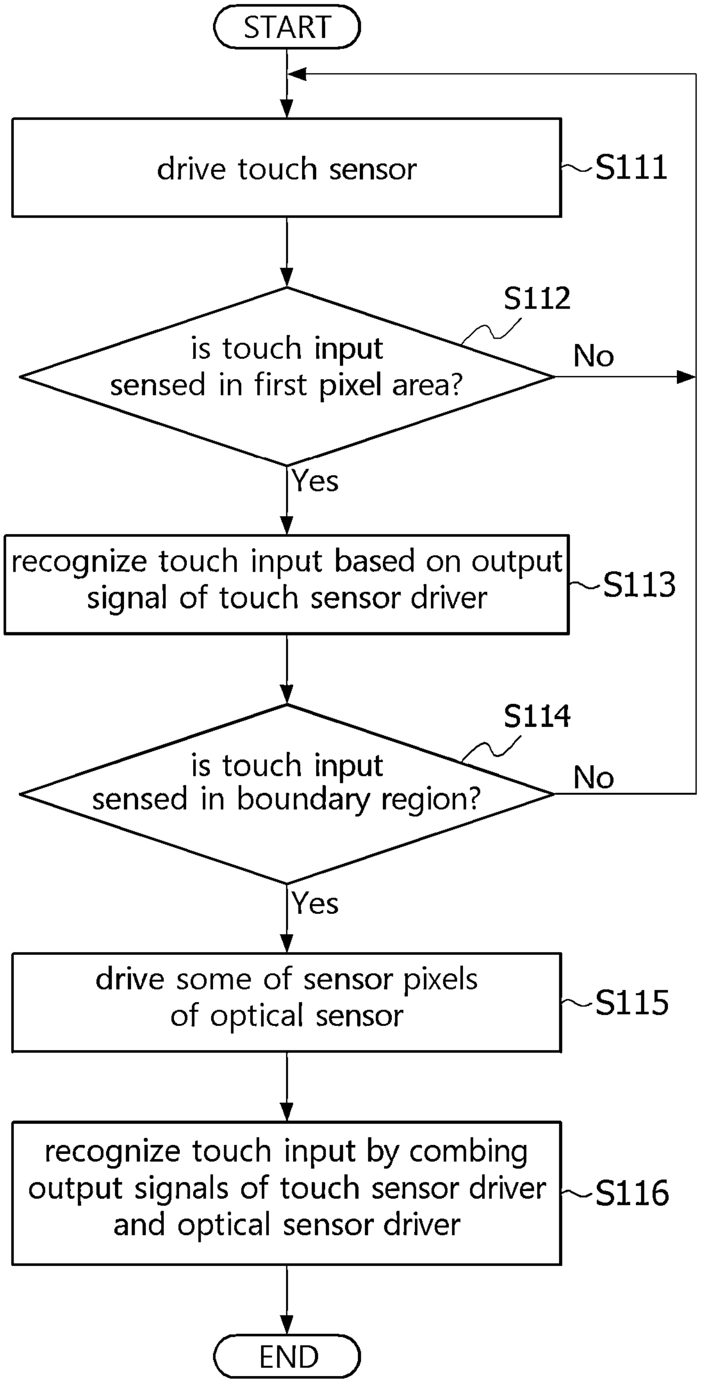
FIG. 11 is a flowchart illustrating a method of controlling a touch recognition mode according to one aspect of the present disclosure.

FIG. 11 is a flowchart illustrating a method of controlling a touch recognition mode according to one aspect of the present disclosure.

Referring to FIG. 11, the touch sensor driver 160 drives the touch sensor Cm under the control of the host system 200 to sense a touch input in the first and second pixel areas NML and UDC of the screen (S111). The touch sensor driver 160 transmits touch data including coordinate information of the corresponding touch input to the host system 200.

The host system 200 recognizes the touch input sensed in the first pixel area NML based on the output signal of the touch sensor driver 160, i.e., the touch data (S112 and S113).

The host system 200 reads the value of the touch data received from the touch sensor driver 160 and, when the touch input is sensed in the boundary region BDR proximate to the second pixel area UDC, controls the optical sensor driver 170 to drive some sensor pixels of the optical sensor 30 (S114 and S115). The optical sensor 30 driven in the touch recognition mode may be an image sensor. The sensor pixels driven in the touch recognition mode may be selected based on the location of the touch sensors. The sensor pixels that are driven in the touch recognition mode will be described in more detail with reference to FIGS. 18 to 20.

In the touch recognition mode, the optical sensor driver 170 receives the data requested by the host system 200, i.e., the signal outputted from the sensor pixels of the optical sensor 30 when the touch input is recognized in the boundary region BDR, i.e., photoelectrically converted touch data, and transmits it to the host system 200. The host system 200 recognizes the touch input in the first and second pixel areas NML and UDC based on the touch data that combines the output signal of the touch sensor driver 160 and the output signal of the optical sensor driver 170 (S116).

Figure 12:
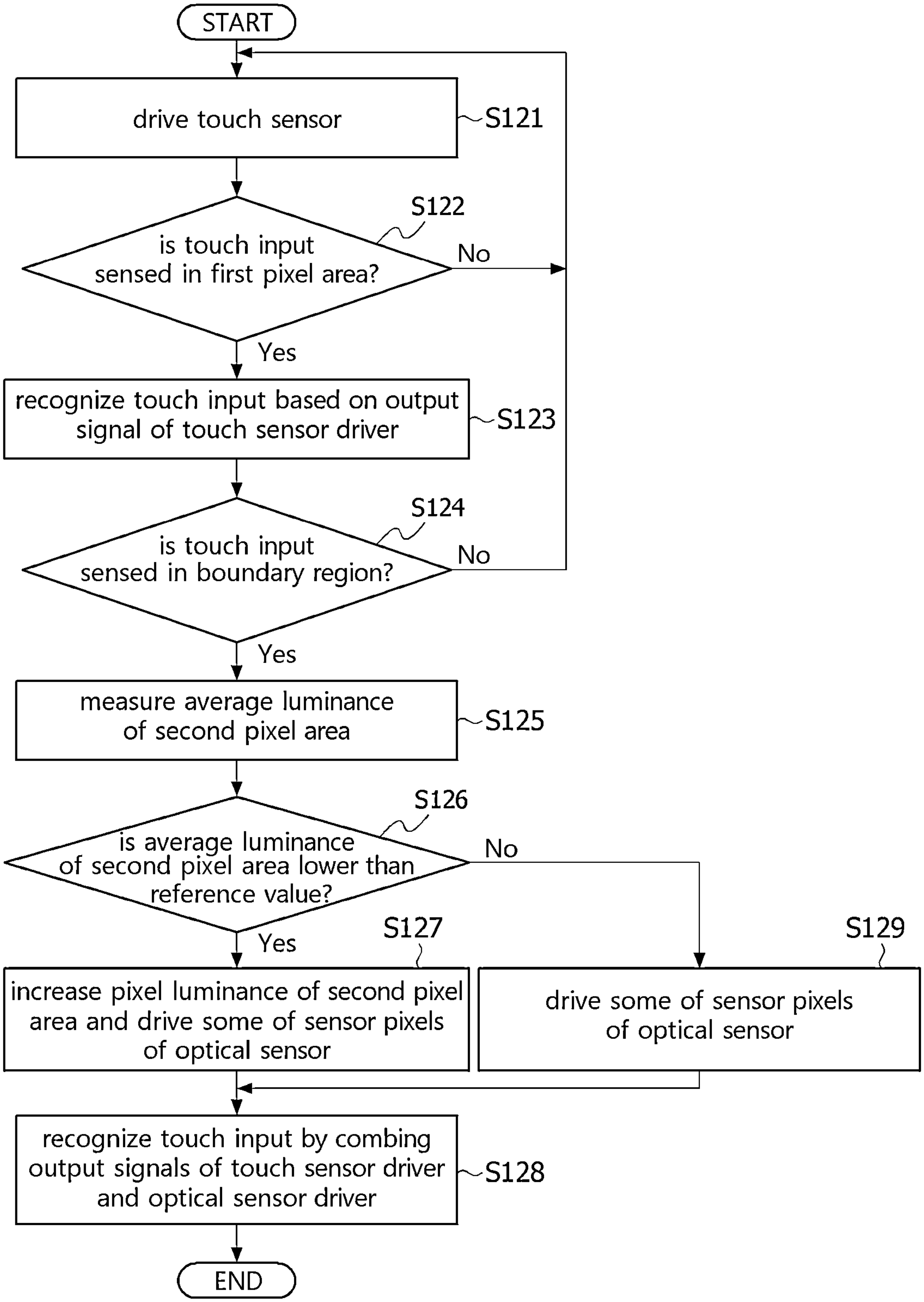
FIG. 12 is a flowchart illustrating a method of controlling a touch recognition mode according to another aspect of the present disclosure.

FIG. 12 is a flowchart illustrating a method of controlling a touch recognition mode according to another aspect of the present disclosure.

Referring to FIG. 12, the touch sensor driver 160 drives the touch sensor Cm under the control of the host system 200 to sense a touch input in the first and second pixel areas NML and UDC of the screen (S121). The touch sensor driver 160 transmits touch data including coordinate information of the corresponding touch input to the host system 200.

The host system 200 recognizes the touch input sensed in the first pixel area NML based on the output signal of the touch sensor driver 160 (S122 and S123).

The host system 200 reads the value of the touch data received from the touch sensor driver 160 and, when the touch input is sensed in the boundary region BDR proximate to the second pixel area UDC, measures an average luminance of the second pixel area UDC (S124 and S125). The average luminance of the second pixel area UDC may be calculated based on a total sum or average value, an average picture level APL, or a histogram of pixel data written to the display pixels of the second pixel area UDC. Meanwhile, the display pixels disposed in the second pixel area UDC include the light emitting elements, and the pixel circuit for driving the light emitting elements is disposed in the boundary region BDR.

The host system 200 compares the average luminance of the second pixel area UDC measured in step S125 with a predetermined reference value, and when the average luminance of the second pixel area UDC is lower than the predetermined reference value, increases the luminance of the display pixels disposed in the second pixel area UDC, and drives some sensor pixels of the optical sensor 30 by controlling the optical sensor driver 170 (S126 and S127). When the average luminance of the second pixel area UDC is lower than the predetermined reference value, the touch input may not be recognized because the amount of light received by the optical sensor 30 is insufficient.

The host system 200 may increase the luminance of the display pixels such that the average luminance of the second pixel area UDC is equal to or greater than the predetermined reference value. The luminance of the display pixels may be increased by increasing the gray scale value of the pixel data written to the display pixels or by controlling the power supply 150 to increase the gamma reference voltage applied to the data driver 110. When the touch input occurs in the second pixel area UDC, because a touch object, such as the user's finger, covers the second pixel area UDC, thereby increasing the luminance of the second pixel area UDC. In other words, in a touch input situation in which the user does not feel an increase in luminance of the second pixel area UDC, the sensing sensitivity of the optical sensor may be increased by increasing the luminance of the second pixel area UDC. When sensing sensitivity of the optical sensor is improved in the second pixel area UDC, imaging, touch recognition, and face recognition sensitivities may be improved.

The optical sensor driver 170 receives the data requested by the host system 200 in the touch recognition mode, i.e., the photoelectrically converted touch data, and transmits it to the host system 200. The host system 200 recognizes the touch input in the first and second pixel areas NML and UDC based on the touch data that combines the output signal of the touch sensor driver 160 and the output signal of the optical sensor driver 170 (S128).

The host system 200 drives some sensor pixels of the optical sensor 30 by controlling the optical sensor driver 170 when the average luminance of the second pixel area UDC measured in step S125 is equal or greater than the predetermined reference value, and recognizes the touch input in the first and second pixel areas NML and UDC based on the touch data that combines the output signal of the touch sensor driver 160 and the output signal of the optical sensor driver 170 (S126, S128, and S129).

Figure 13:
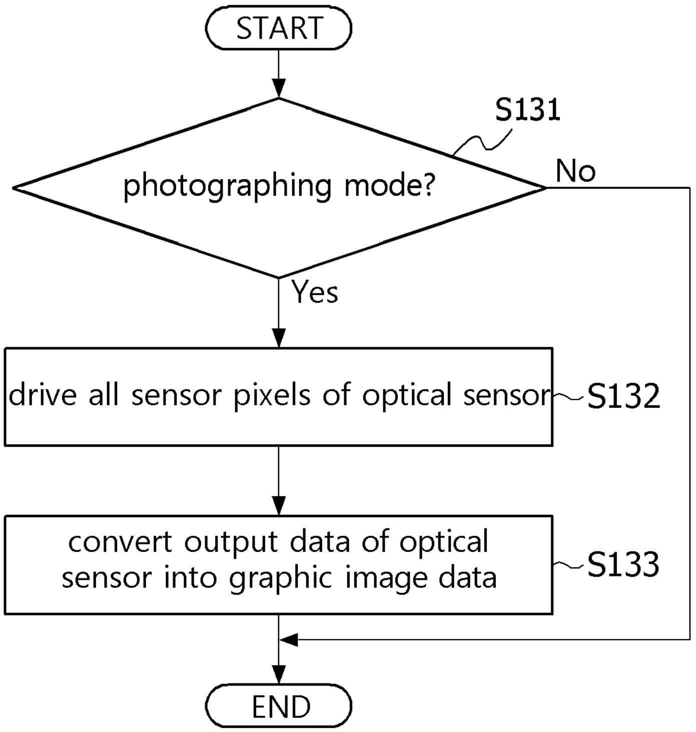
FIG. 13 is a flowchart illustrating a method of controlling a photographing mode according to one aspect of the present disclosure.

FIG. 13 is a flowchart illustrating a method of controlling a photographing mode according to one aspect of the present disclosure.

Referring to FIG. 13, the host system 200 enters a photographing mode when a photographing event occurs and enables the optical sensor driver 170 to drive all sensor pixels of the optical sensor 30 (S131 and S132). The optical sensor 30 driven in the photographing mode may be an image sensor.

The host system 200 converts the data received from the optical sensor 160 in the photographing mode into graphical image data (S133).

Figure 14:
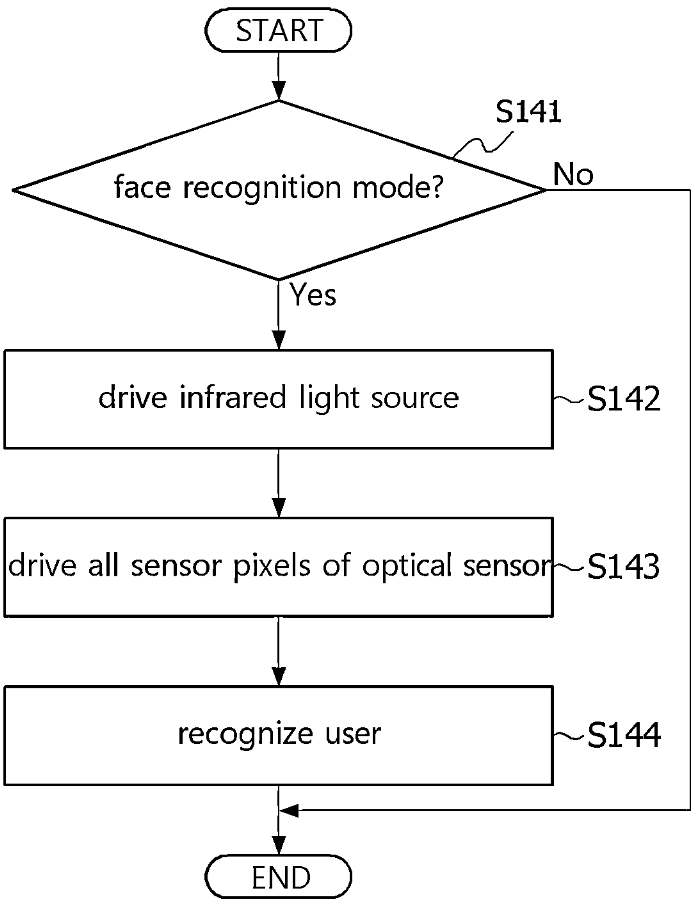
FIG. 14 is a flowchart illustrating a method of controlling a face recognition mode according to one aspect of the present disclosure.

FIG. 14 is a flowchart illustrating a method of controlling the face recognition mode according to one aspect of the present disclosure.

Referring to FIG. 14, the host system 200 enters a face recognition mode when a user authentication event occurs, enables the optical sensor driver 170 to drive an infrared light source, and drives all sensor pixels of the optical sensor 30 to receive the facial feature data of the user (S141, S142, and S143). The optical sensor 30 driven in the face recognition mode may be an infrared light source and an infrared sensor element.

In the face recognition mode, the host system 200 processes user authentication by comparing the facial feature point data received from the optical sensor driver 170 with the pre-registered facial feature point data of the user (S144).

Figure 15:
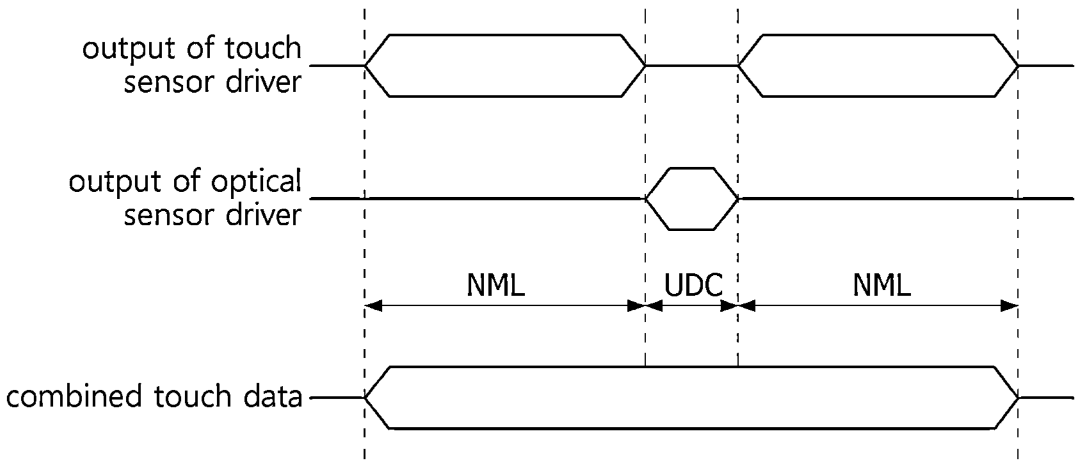
FIG. 15 is a diagram illustrating an example of output signals from a touch sensor driver and an optical sensor driver transmitted to a host system in a touch recognition mode.

FIG. 15 is a diagram illustrating output signals of the touch sensor driver 160 and the optical sensor driver 170 transmitted to the host system 200 in the touch recognition mode.

Referring to FIG. 15, the touch sensor driver 160 applies driving signals to the driving wires TX1 to TX4 sequentially along a predetermined touch scan direction to perform a first touch scan on the touch sensors, and outputs touch data obtained based on the amount of charge change in the touch sensors Cm through the sensing wires RX1 to RX4. The touch sensor driver 160 transmits touch data including coordinate information of the touch input in the first pixel area NML to the host system 200, pauses the first touch scan during a second touch scan period of the second pixel area UDC, resumes the first touch scan after the second touch scan of the second pixel area UDC ends, and transmits the touch data obtained from the touch sensors present in the remainder of the first pixel area NML to the host system 200.

Figure 16:
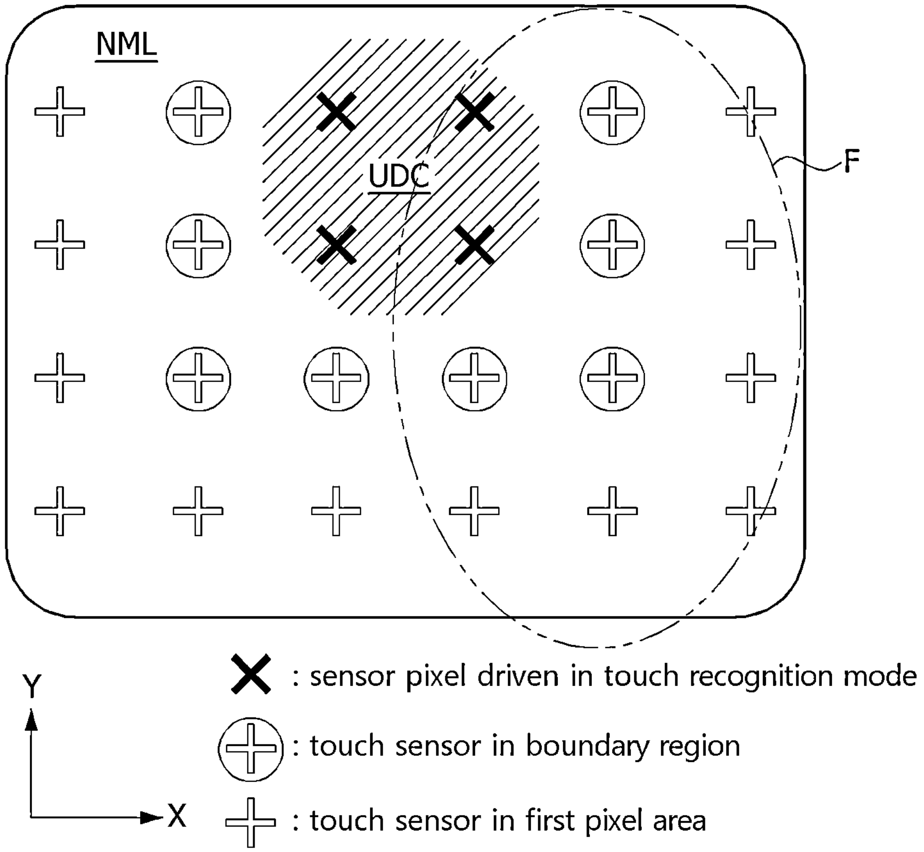
FIG. 16 is a diagram illustrating a touch object that generates a touch input in a boundary region of a first pixel area and in a second pixel area.

The optical sensor driver 170 starts to be driven when the touch input is sensed in the boundary region BDR, as shown in FIG. 16, under the control of the host system 200 in the touch recognition mode. The optical sensor driver 170 starts scanning the sensor pixels at predetermined positions from the time the touch input is sensed in the boundary region BDR, and outputs the touch data obtained from light received by the sensor pixels. The optical sensor driver 170 stops driving after all sensor pixels at the predetermined positions have been scanned in the second pixel area UDC and the touch input in the second pixel area UDC have been sensed, thereby not generating power consumption. Thus, the touch sensitivity may be improved and the power consumption may be reduced by increasing the touch report rate of the touch data outputted from the optical sensor driver 170 in the touch recognition mode.

In the touch recognition mode, the host system 200 may recognize the touch input in the first and second pixel areas NML and UDC based on the touch data that combines the touch data received from the touch sensor driver 160 and the touch data received from the optical sensor driver 170.

FIG. 16 is a diagram illustrating a touch object that generates a touch input in the boundary region BDR of the first pixel area NML and in the second pixel area UDC. The touch object may be a user's finger F. When the user's finger F is placed in the second pixel area UDC as well as the boundary region BDR, the host system 200 first recognizes the touch input in the boundary region BDR with the touch data received from the touch sensor driver 160 and enables the optical sensor driver 170. Accordingly, the optical sensor drive 170 starts to drive the optical sensor 30 after the touch input is recognized in the boundary region BDR and transmits the touch data obtained from the light received through the second pixel area UDC to the host system 200.

Figure 17:
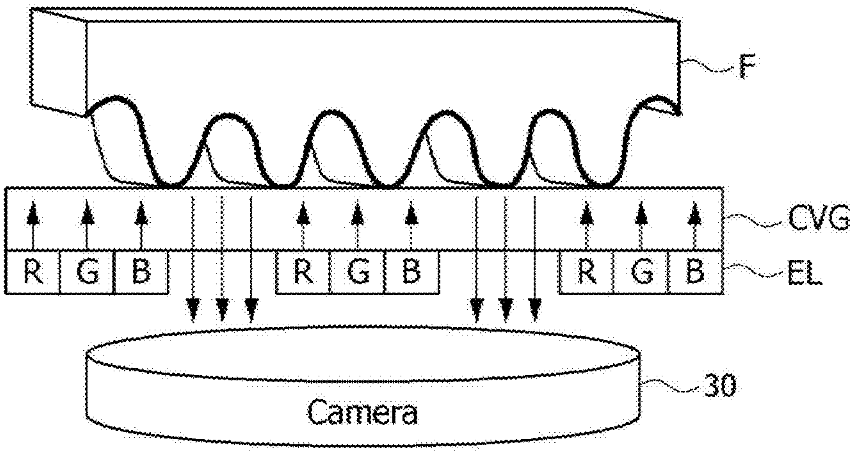
FIG. 17 is a diagram illustrating an example in which light emitting elements of a second pixel area emit light in a touch recognition mode.

FIG. 17 is a diagram illustrating an example in which the light emitting element layer EL of the second pixel area UDC emit light in the touch recognition mode. In the touch recognition mode, a touch input may not be sensed if the amount of light received when driving the optical sensor 30 is insufficient. In this case, the sensitivity of sensing touch input may be increased by increasing the amount of light that passes through the second pixel area UDC and is received by the optical sensor 30.

In the touch recognition mode, the light emitting elements R, G, and B disposed in the second pixel area UDC may be driven at higher luminance and emit light to increase the amount of light received by the optical sensor 30. In this case, the average luminance of the second pixel area UDC may be increased to improve the touch sensitivity of the second pixel area UDC.

Figure 18:
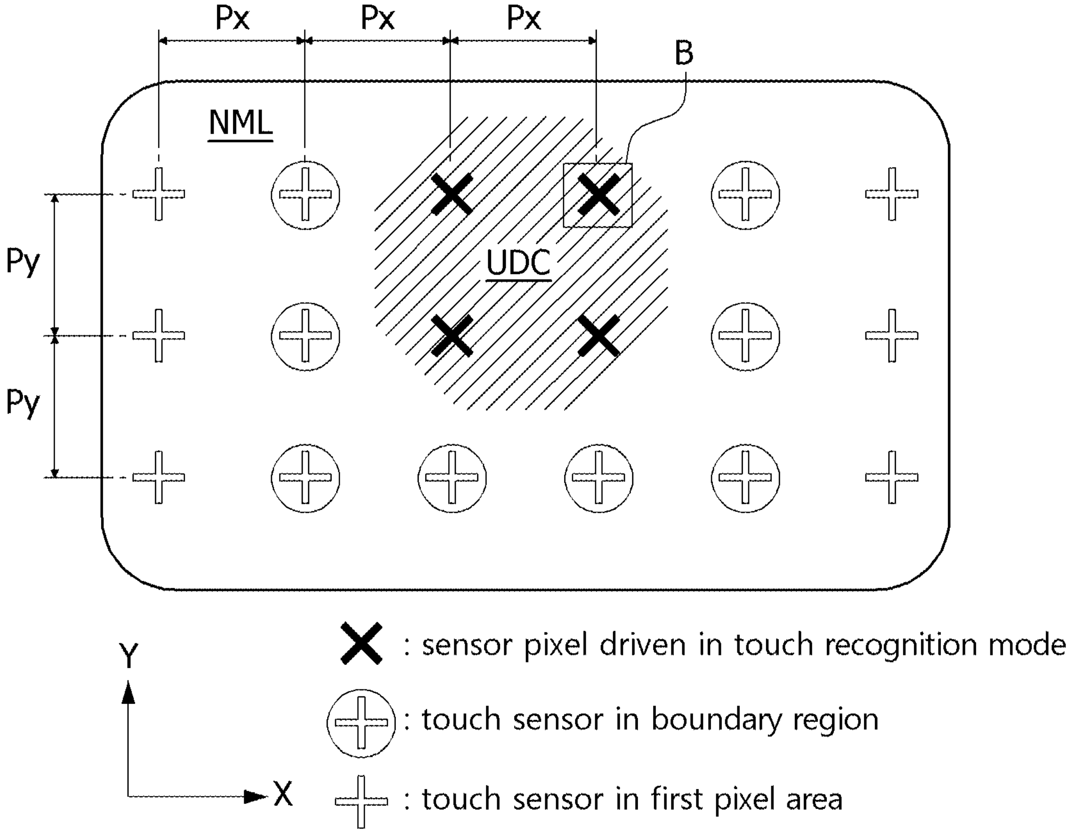
FIG. 18 is a diagram illustrating a touch sensing position in a second pixel area set at an interval equal to the pitch between neighboring touch sensors disposed in the first pixel area.

FIG. 18 is a diagram illustrating touch sensing positions in the second pixel area UDC set at an interval equal to the pitch between the neighboring touch sensors disposed in the first pixel area NML.

The resolution of the optical sensor 30 is much higher than the resolution of the touch sensors Cm. To make the touch recognition resolution uniform between the first and second pixel areas NML and UDC, in the touch recognition mode, it is not necessary to drive all the sensor pixels of the optical sensor 30, but only the sensor pixels spaced at an interval equal to the pitch between the neighboring touch sensors Cm in the optical sensor 30 superimposed in the second pixel area UDC may be driven. In FIG. 18, "Px" is the pitch between neighboring touch sensors Cm in the first direction X and "Py" is the pitch between neighboring touch sensors Cm in the second direction Y. The optical sensor 30 superimposed in the second pixel area UDC may include high-resolution sensor pixels. Some of the sensor pixels may be driven in the touch recognition mode. The interval between the sensor pixels driven in the touch recognition mode may be equal to the pitch Px or Py between the touch sensors Cm. In other aspects, lines of sensor pixels extending in the first direction X may be driven in the touch recognition mode.

Figure 19:
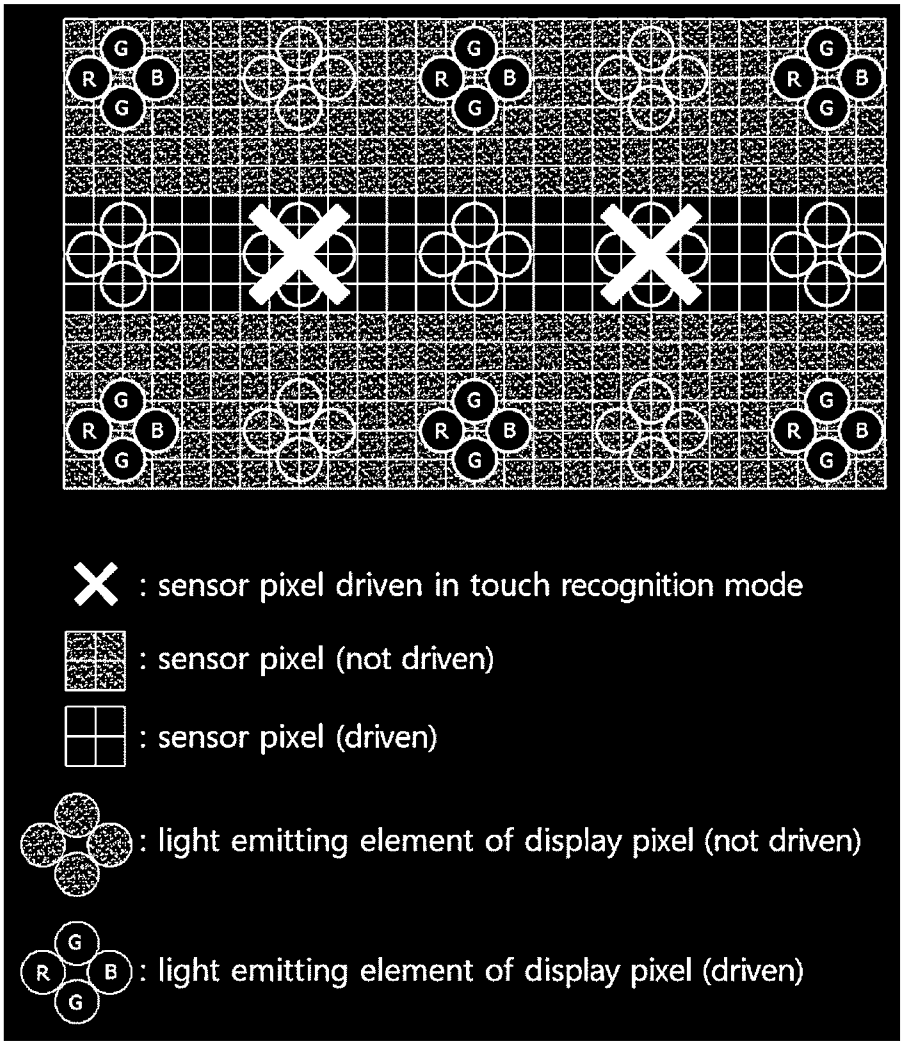
FIG. 19 is a diagram illustrating an example in which sensor pixels disposed on some lines of an optical sensor are driven in a touch recognition mode.
Figure 20:
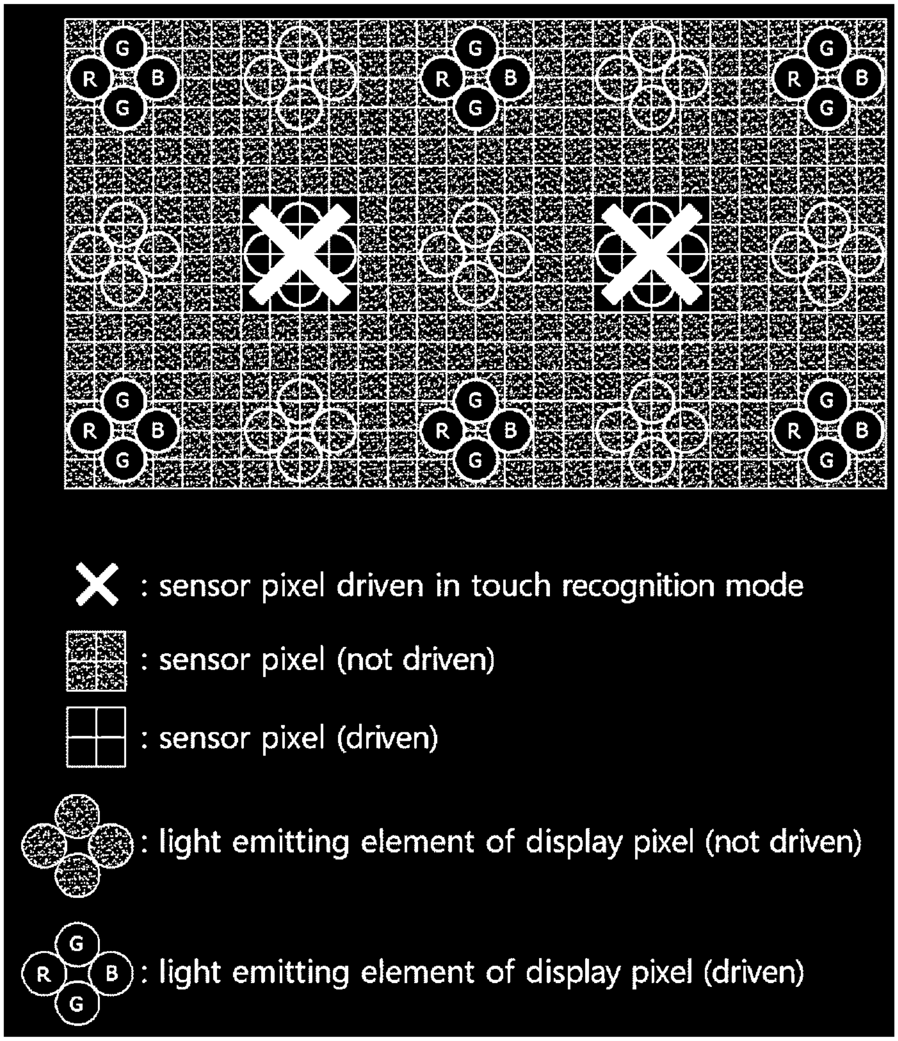
FIG. 20 is a diagram illustrating an example in which only sensor pixels of an optical sensor spaced at an interval equal to the pitch between neighboring touch sensors are driven in a touch recognition mode.

FIGS. 19 and 20 are diagrams illustrating an example in which some sensor pixels of the optical sensor are driven in the touch recognition mode.

Referring to FIG. 19, to prevent unnecessary power consumption of the optical sensor 30 without degrading the touch recognition performance, in the touch recognition mode, a line of sensor pixels extending from an imaginary line on which the touch sensors Cm are disposed may be scanned so that the sensor pixels disposed on the line of sensor pixels are driven, and touch data may be obtained based on the output signals of some of the sensor pixels. Sensor pixels on the line of sensor pixels that are not scanned may not be driven.

Referring to FIG. 20, sensor pixels in a sensor block, which include sensor pixels spaced at an interval equal to the pitch between the neighboring touch sensors Cm in each of the first and second directions, may be scanned and driven, and other sensor pixels may not be driven. The sensor block may include one or more sensors.

The features to be achieved by the present disclosure, the means for achieving the features, and effects of the present disclosure described above do not specify essential features of the claims, and thus, the scope of the claims is not limited to the disclosure of the present disclosure.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:

a first pixel area in which a plurality of light-emitting elements and a plurality of pixel circuits are disposed; and a second pixel area in which a plurality of light-emitting elements, a plurality of first transparent extension lines, and a plurality of second transparent extension lines are disposed, wherein the second pixel area includes:

a first insulating layer covering the first transparent extension lines; and a second insulating layer covering the second transparent extension lines, and the first insulating layer, wherein the first transparent extension lines overlap with the second transparent extension lines with the first insulating layer interposed therebetween, anode electrodes of a first group of light-emitting elements disposed in the second pixel area are connected to the first transparent extension lines via contact holes penetrating the first and second insulating layers, anode electrodes of a second group of light-emitting elements in the second pixel area are connected to the second transparent extension lines via contact holes penetrating the second insulating layer, wherein each of the first and second pixel areas includes:

a light-emitting element layer in which the light-emitting elements of the first pixel area and the light-emitting elements of the second pixel area are disposed;

an encapsulation layer covering the light-emitting element layer; and a touch sensor layer covering the encapsulation layer.

2. The display panel of claim 1, wherein a density of the light-emitting elements disposed in the second pixel area is the same as a density of the light-emitting elements disposed in the first pixel area.

3. The display panel of claim 1, wherein each of the first and second pixel areas further includes:

a first polyimide substrate;

a second polyimide substrate disposed on the first polyimide substrate with an inorganic film interposed therebetween; and a plurality of insulating layers disposed between the second polyimide substrate and the light-emitting element layer.

4. The display panel of claim 3, wherein the pixel circuits of the first pixel area are disposed within the plurality of insulating layers disposed between the second polyimide substrate and the light-emitting element layer.

5. The display panel of claim 4, wherein each of the pixel circuits comprises:

at least one transistor including an oxide semiconductor; and at least one transistor including a polysilicon semiconductor.

6. The display panel of claim 4, wherein the first and the second transparent extension lines in the second pixel area face the second polyimide substrate without a pixel circuit interposed therebetween, with the plurality of insulating layers disposed between the second polyimide substrate and the light-emitting element layer.

7. The display panel of claim 4, wherein the plurality of insulating layers disposed between the second polyimide substrate and the light-emitting element layer include:

a first buffer layer disposed on the second polyimide substrate;

a second buffer layer covering the first buffer layer;

a first gate insulating layer covering the second buffer layer;

a first interlayer insulating layer disposed on the first gate insulating layer;

a third buffer layer disposed on the first interlayer insulating layer;

a second interlayer insulating layer covering the third buffer layer;

a first planarization layer disposed on the second interlayer insulating layer;

a second planarization layer covering the first planarization layer;

a third planarization layer covering the second planarization layer; and a fourth planarization layer covering the third planarization layer.

8. The display panel of claim 7, wherein the pixel circuits of the first pixel area include:

a first metal layer disposed on the first buffer layer;

a first semiconductor layer disposed on the second buffer layer;

a second metal layer disposed on the first gate insulating layer;

a third metal layer disposed on the first interlayer insulating layer;

a second semiconductor layer disposed on the third buffer layer;

a second gate insulating layer covering the second semiconductor layer;

a fourth metal layer disposed on the second gate insulating layer;

a fifth metal layer disposed on the second interlayer insulating layer; and a sixth metal layer disposed on the first planarization layer.

9. The display panel of claim 8, wherein the first semiconductor layer includes a polysilicon semiconductor, and the second semiconductor layer includes an oxide semiconductor.

10. The display panel of claim 1, wherein the encapsulation layer includes:

a first inorganic insulating layer covering the light-emitting element layer;

an organic insulating layer covering the first inorganic insulating layer; and a second inorganic insulating layer covering the organic insulating layer, wherein the touch sensor layer is disposed on the second inorganic insulating layer.

11. The display panel of claim 1, wherein the first pixel area includes at least one touch sensor wiring curved along an outer shape of the second pixel area.

12. The display panel of claim 11, wherein the outer shape of the second pixel area includes a first curved section, and the at least one touch sensor wiring includes a second curved section adjacent to the first curved section.

13. The display panel of claim 12, wherein the at least one touch sensor wiring includes:

a first wiring; and a second wiring crossing the first wiring, wherein at least a portion of each of the first wiring and the second wiring comprises a curved pattern bent along the outer shape of the second pixel area.

14. A display panel comprising:

a first pixel area;

a second pixel area configured to be surrounded by the first pixel area, and electrically connected to the first pixel area; and at least one touch sensor wiring arranged in the first pixel area and curved along an outer shape of the second pixel area, wherein the outer shape of the second pixel area includes a first curved section, and the at least one touch sensor wiring includes a second curved section adjacent to the first curved section.

15. The display panel of claim 14, wherein the first curved section and the second curved section are parallel to each other.

16. The display panel of claim 14, wherein the at least one touch sensor wiring includes:

a first wiring; and a second wiring crossing the first wiring, wherein at least a portion of each of the first wiring and the second wiring includes a curved pattern curved along the outer shape of the second pixel area.

17. The display panel of claim 14, wherein the first pixel area includes a plurality of light-emitting elements and a plurality of pixel circuits, and wherein the second pixel area includes a plurality of light-emitting elements, a plurality of first transparent extension lines, and a plurality of second transparent extension lines, wherein the second pixel area further includes:

a first insulating layer covering the first transparent extension lines; and a second insulating layer covering the second transparent extension lines, and the first insulating layer, wherein the first transparent extension lines overlap with the second transparent extension lines with the first insulating layer interposed therebetween.

18. A display device comprising:

a display panel including a first pixel area in which a plurality of touch sensors disposed, and a second pixel area surrounded by the first pixel area; and an optical sensor disposed below the second pixel area of the display panel, wherein the first pixel area includes a plurality of light-emitting elements, a plurality of pixel circuits, at least one touch sensor wiring configured to be curved along an outer shape of the second pixel area connected to at least one touch sensor, and wherein the second pixel area includes a plurality of light-emitting elements, a plurality of first transparent extension lines, and a plurality of second transparent extension lines, wherein the second pixel area includes:

a first insulating layer covering the first transparent extension lines; and a second insulating layer covering the second transparent extension lines and the first insulating layer, wherein the first transparent extension lines overlap the second transparent extension lines with the first insulating layer interposed therebetween, wherein the first at least one touch sensor wiring arranged in the first pixel area and curved along an outer shape of the second pixel area.

* * * * *